US008321530B2

(12) United States Patent
Miyazawa

(10) Patent No.: US 8,321,530 B2
(45) Date of Patent: Nov. 27, 2012

(54) CLOUD COMPUTING SYSTEM, SERVER COMPUTER, DEVICE CONNECTION METHOD, AND STORAGE MEDIUM

(75) Inventor: Hiroyasu Miyazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/102,284

(22) Filed: May 6, 2011

(65) Prior Publication Data

US 2011/0295970 A1    Dec. 1, 2011

(30) Foreign Application Priority Data

May 27, 2010    (JP) ................................. 2010-121962

(51) Int. Cl.
*G06F 15/16*    (2006.01)
(52) U.S. Cl. ......... 709/217; 709/203; 709/229; 370/401
(58) Field of Classification Search ................... 709/203, 709/217, 229; 370/401
See application file for complete search history.

(56) References Cited

U.S. PATENT DOCUMENTS

| | | | |
|---|---|---|---|
| 7,133,933 B2 * | 11/2006 | Shah et al. .................... | 709/248 |
| 7,260,596 B1 * | 8/2007 | Zhou ............................ | 709/200 |
| 7,913,042 B2 * | 3/2011 | Ogihara et al. ............... | 711/154 |
| 8,117,325 B1 * | 2/2012 | Wu ................................ | 709/229 |
| 2004/0054800 A1 * | 3/2004 | Shah et al. .................... | 709/231 |
| 2009/0059936 A1 * | 3/2009 | Van De Poel et al. ........ | 370/401 |
| 2009/0150553 A1 * | 6/2009 | Collart et al. ................. | 709/229 |
| 2011/0196914 A1 * | 8/2011 | Tribbett ........................ | 709/203 |
| 2011/0231469 A1 * | 9/2011 | Wolman et al. ............... | 709/201 |
| 2011/0283202 A1 * | 11/2011 | Drews et al. .................. | 715/752 |
| 2012/0242778 A1 * | 9/2012 | Ayers ......................... | 348/14.09 |

FOREIGN PATENT DOCUMENTS

JP    2009-237859 A    10/2009

* cited by examiner

*Primary Examiner* — Tesfay Yohannes
(74) *Attorney, Agent, or Firm* — Canon USA, Inc., IP Division

(57) ABSTRACT

A cloud computing system includes an initial request reception unit, a request reception unit, and a transmission unit. The initial request reception unit receives a connection request from a device. In a case where the device has tried to access a request reception unit, the request reception unit receives a service usage request and service identification information from the device and determines whether a back-end processing unit is present that both corresponds to the device and is configured to execute the service. If present, a service utilization preparation completion screen is transmitted to the device. If not present, an instance generation instruction is sent to a management unit and instruction to launch an instance generated to execute the service is sent. After the instance is launched and the back-end processing unit is realized, the service utilization preparation completion screen is transmitted to the device.

8 Claims, 20 Drawing Sheets

FIG.7A

| device_id (701) | site_id (702) | service_id (703) |
|---|---|---|
| dev_a_sr8rlheJmCd6npd | site_0001 | print |
| dev_b_hjaoerkeer4lseaa | site_0011 | print, scan, ocr |

FIG.7B

| partition_key (711) | site_id (712) | URI (713) |
|---|---|---|
| site | site_0001 | http//server01/ |
| site | site_0010 | http//server02/ |

FIG.7C

| model_id (721) | service_id (722) | instance (723) |
|---|---|---|
| model_a0001 | print | 1 |
| model_a0002 | print | 5 |
| model_b0010 | print | 0 |
| model_b0010 | scan | 1 |

FIG.7D

| model_id (731) | service_id (732) | path (733) |
|---|---|---|
| model_a0001 | print | lib/print/a0001 |
| model_a0002 | print | lib/print/a0002 |
| model_b0010 | print | lib/print/b0010 |
| model_b0010 | scan | lib/scan/b0010 |

FIG.8

```
<?xml version="1.0" encoding="UTF-8"?>
<config>
        <connect_URI>http://server/first</connect_URI>~801
        ...
</config>
```

FIG.9

Accept: */*
Accept-Language: en-us
User-Agent: Mozilla/4.0
Connection: Keep-Alive X-device-id: dev_a_sr8rlheJmCd6npd ~901

FIG.11A

```
<WorkerRole name="WorkerRole">
   <ConfigurationSettings>
      <Setting name="ModuleKey/>  ~1101
      ...
   </ConfigurationSettings>
</WorkerRole>
```

FIG.11B

```
<Role name="WorkerRole">
   <Instance count="10"/>              1102
   <ConfigurationSettings>
      <Setting name="ModuleKey" value="model_a0001|print"/>
      ...
   </ConfigurationSettings>
</Role>
```

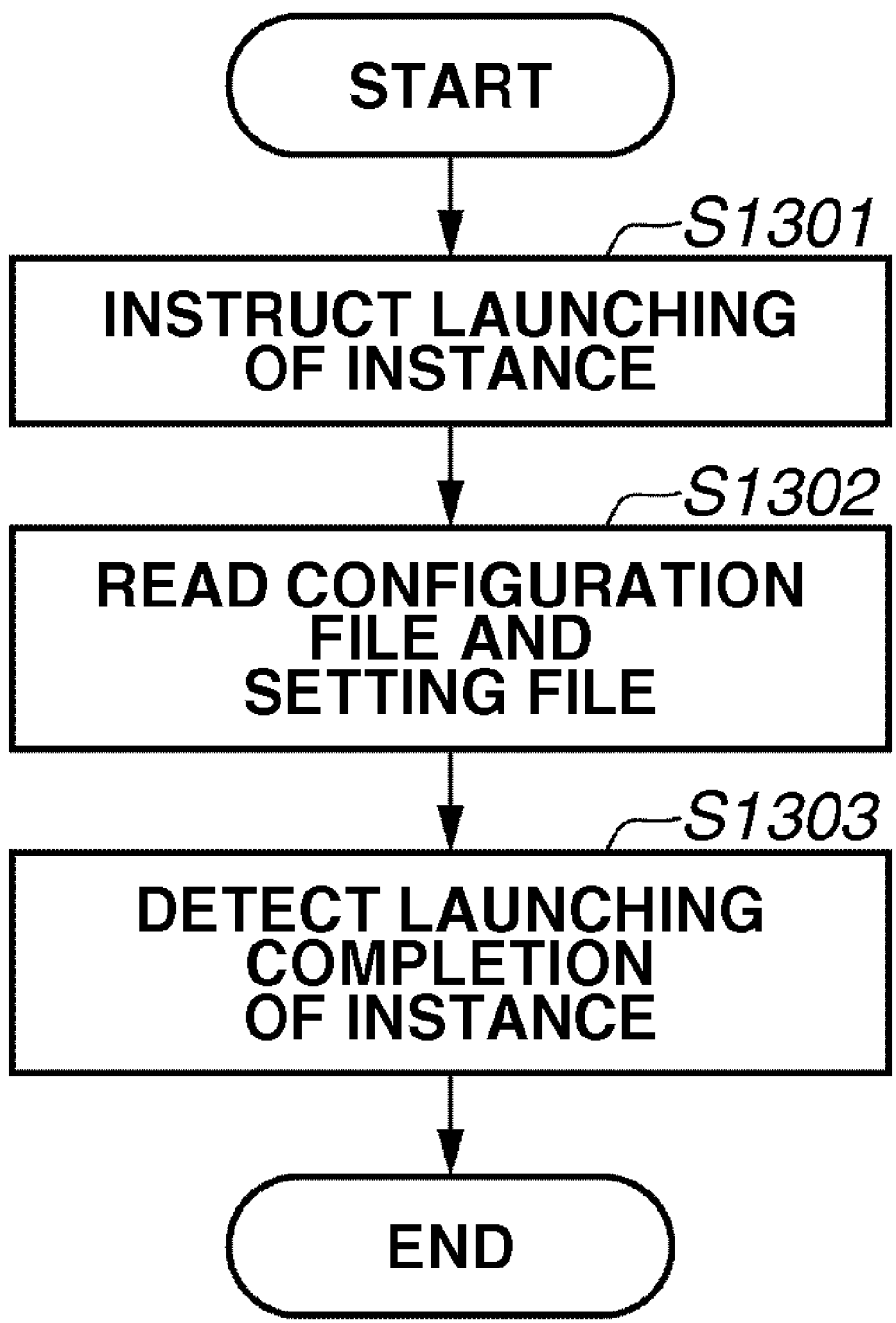

FIG.15

| device_id | site_id | service_id | replace_device_id | replace_model_id |
|---|---|---|---|---|
| dev_a_sr8rlheJmCd6npd | site_0001 | print | dev_old00001 | model_old0001 |
| dev_b_hjaoerkeer4lseaa | site_0010 | print, scan, ocr | dev_old00002 | model_old0010 |
| dev_old00001 | site_0001 | print | | |
| dev_old00002 | site_0010 | print, scan, ocr | | |
| dev_old00003 | site_0001 | print, scan, ocr | | |

1501　1502　1503　1504　1505

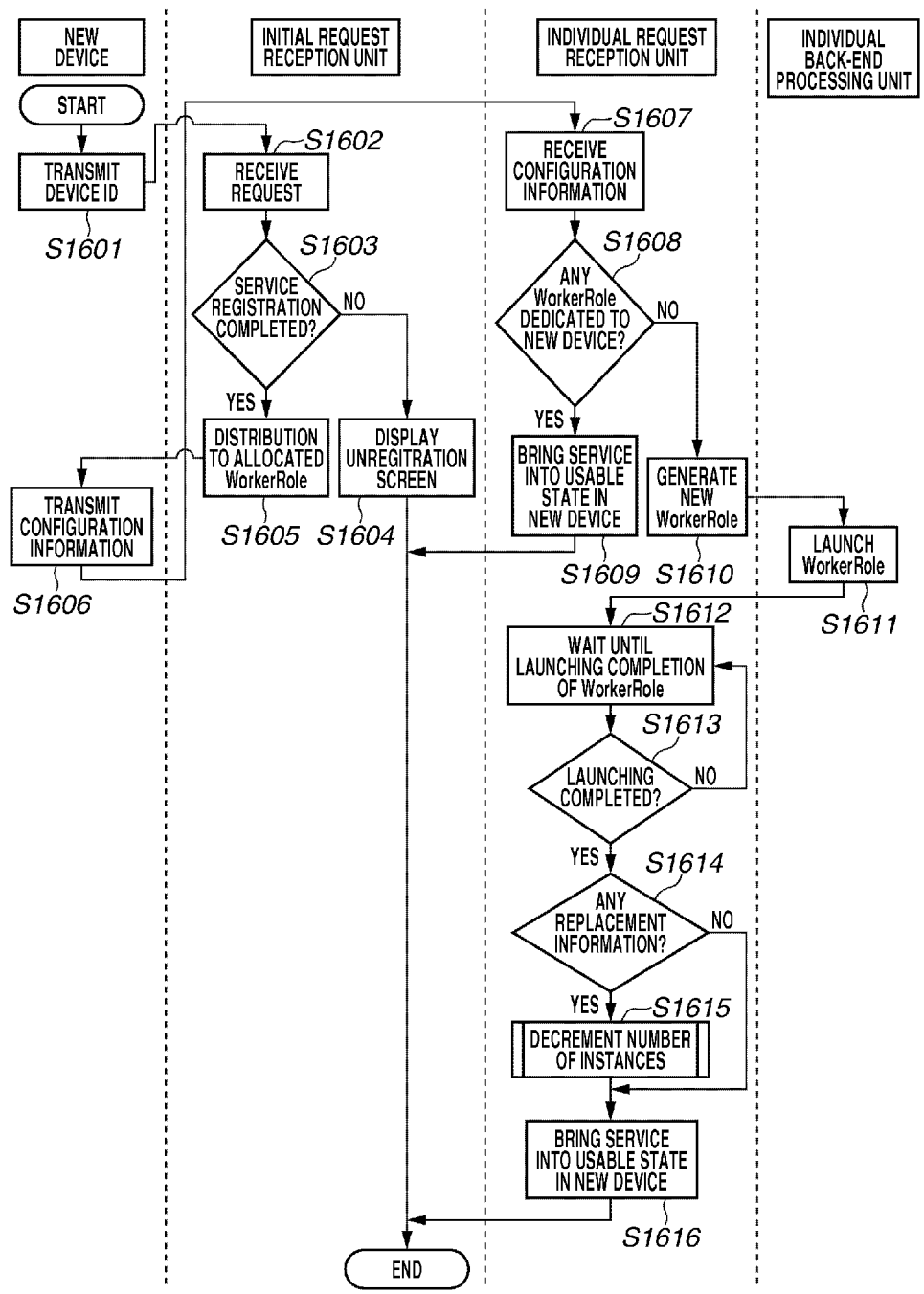

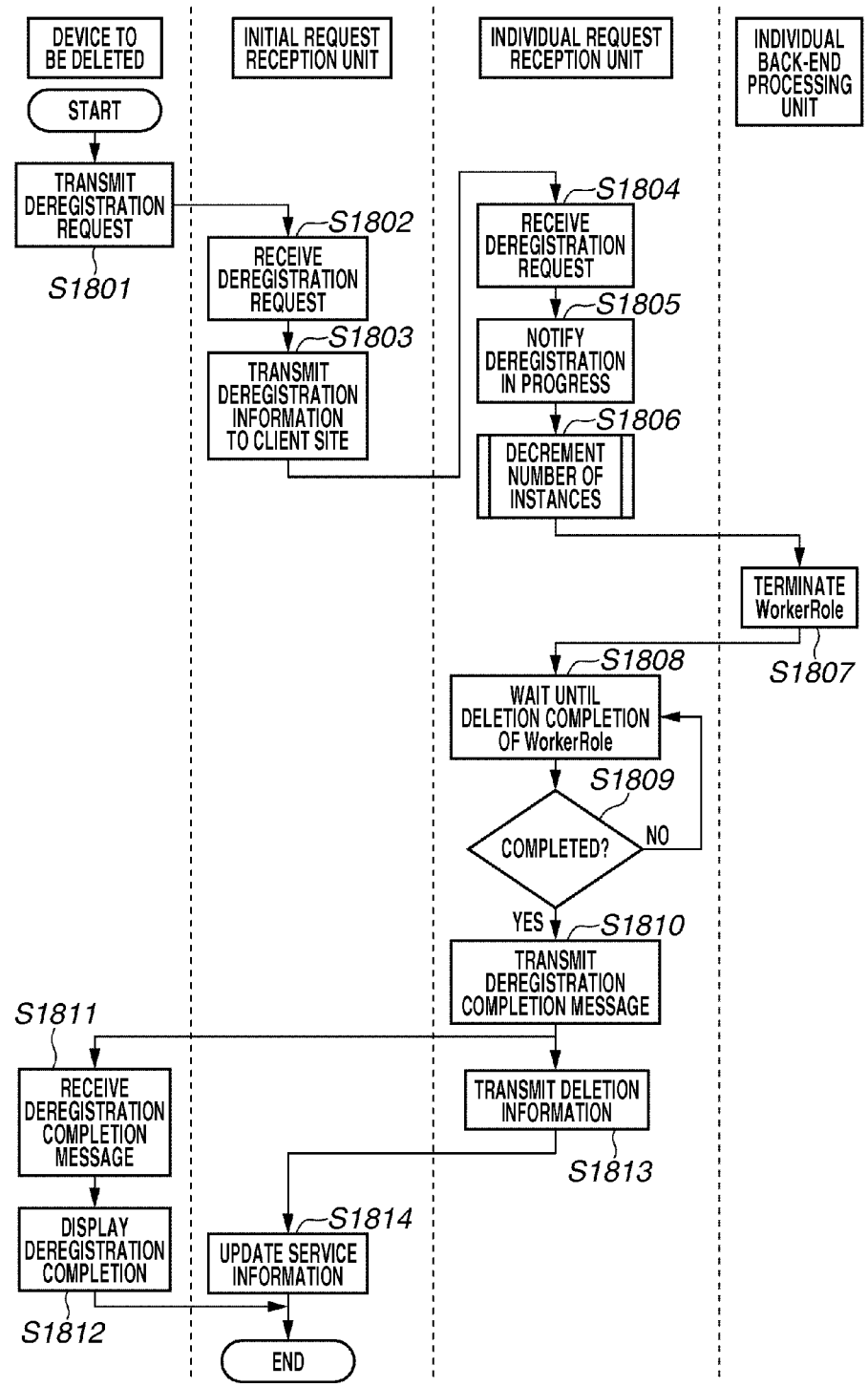

CLOUD COMPUTING SYSTEM, SERVER COMPUTER, DEVICE CONNECTION METHOD, AND STORAGE MEDIUM

BACKGROUND OF THE INVENTION

1. Field of the Invention

The present invention relates to a cloud computing system, a server computer, a device connection method, and a storage medium.

2. Description of the Related Art

A content management system is widely known and used as an Internet-based management system. The content management system enables a user of each client computer to access a web site of a server computer via the Internet and select a content to browse on the web site. The content management system transmits a selected content to the server computer. The server computer processes the received content so that the content can be displayed on the client computer.

A cloud computing system and a "Software as a Service" (SaaS) are recent techniques usable when the server computer performs various processing.

The cloud computing system has the capability of simultaneously processing various requests received from numerous clients by discretely executing data conversion and data processing using virtualized computing resources.

As discussed in Japanese Patent Application Laid-Open No. 2009-237859, there is a conventional method for managing virtualized computing resources. The conventional managing method includes measuring a load of processing to be executed on a virtualized computer, and recording processing load information. The conventional method further includes measuring load information at launching timing of the processing as well as load information at termination timing of the processing, and recording the obtained processing launching/termination load information. The method further includes changing the state of a virtualized computing resource based on the obtained load information.

However, for example, in a case where an image forming apparatus is newly connected to the cloud computing system to provide a network printing system, it is important to determine an effective allocation of the computing resources to provide a useful network printing system. In this case, to connect the newly added device to the cloud computing system, an administrator is required to set a connection destination at a setup location of the device. In general, the administrator manually allocates a computing resource to the newly added device. Thus, the preliminary setting work requires a significant amount of time and labor.

SUMMARY OF THE INVENTION

The present invention is directed to a technique capable of reducing time and labor required before a service becomes available at a device newly added to a cloud computing system and capable of improving easiness in installing the device.

According to an aspect of the present invention, a cloud computing system includes a group of server computers and further includes an initial request reception unit configured to receive a connection request from a device configured to transmit the connection request, a service usage request, and service identification information, wherein the initial request reception unit includes a notification unit configured to notify the device of information required to identify a request reception unit configured to receive a service usage request; a request reception unit configured, in a case where the device has tried to access the request reception unit based on the information required to identify a request reception unit, to receive a service usage request and service identification information transmitted from the device, wherein the request reception unit includes a determination unit configured to determine, based on the received service identification information, whether a back-end processing unit is present that both corresponds to the device and is configured to execute the service; and a transmission unit configured, in a case where the determination unit determines that a back-end processing unit that both corresponds to the device and is configured to execute the service is present, to transmit a service utilization preparation completion screen to the device without instructing generation of an instance that can realize the back-end processing unit and, in a case where the determination unit determines that a back-end processing unit that both corresponds to the device and is configured to execute the service is not present, to send an instance generation instruction to a management unit configured to manage instances and to further send an instruction to launch an instance generated to execute the service, wherein after the instance is launched and the back-end processing unit is realized, the transmission unit further is configured to transmit the service utilization preparation completion screen to the device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7A illustrates an example of a device registration table according to an exemplary embodiment.

FIG. 7B illustrates an example of an individual request reception unit management table according to an exemplary embodiment.

FIG. 7C illustrates an example of a service instance management table according to an exemplary embodiment.

FIG. 7D illustrates an example of a module path management table according to an exemplary embodiment.

FIG. 8 illustrates an example of a setting file for the image forming apparatus according to an exemplary embodiment.

FIG. 9 illustrates an example of an http header to be transmitted from the image forming apparatus to a URI defined by a setting value of a connection destination URI illustrated in FIG. 8 according to an exemplary embodiment.

FIG. 11A illustrates an example of a configuration file stored in a back-end processing unit according to an exemplary embodiment.

FIG. 11B illustrates an example of a setting file stored in the back-end processing unit according to an exemplary embodiment.

FIG. 13 is a flowchart illustrating an example of processing for launching a WorkerRole instance (i.e., processing to be performed in step S1011 illustrated in FIG. 10) according to an exemplary embodiment.

FIG. 15 illustrates an example of a device registration table with replacement information being added according to an exemplary embodiment.

FIG. 16 is a flowchart illustrating an example of processing for generating and launching a WorkerRole instance corresponding to a newly added image forming apparatus and deleting a WorkerRole instance to be replaced according to an exemplary embodiment.

FIG. 18 is a flowchart illustrating an example of processing for deleting and deregistering a corresponding WorkerRole instance of the back-end processing unit in response to a service deregistration request received from the image forming apparatus according to an exemplary embodiment.

DESCRIPTION OF THE EMBODIMENTS

Various exemplary embodiments, features, and aspects of the invention will be described in detail below with reference to the drawings.

Figure 1:
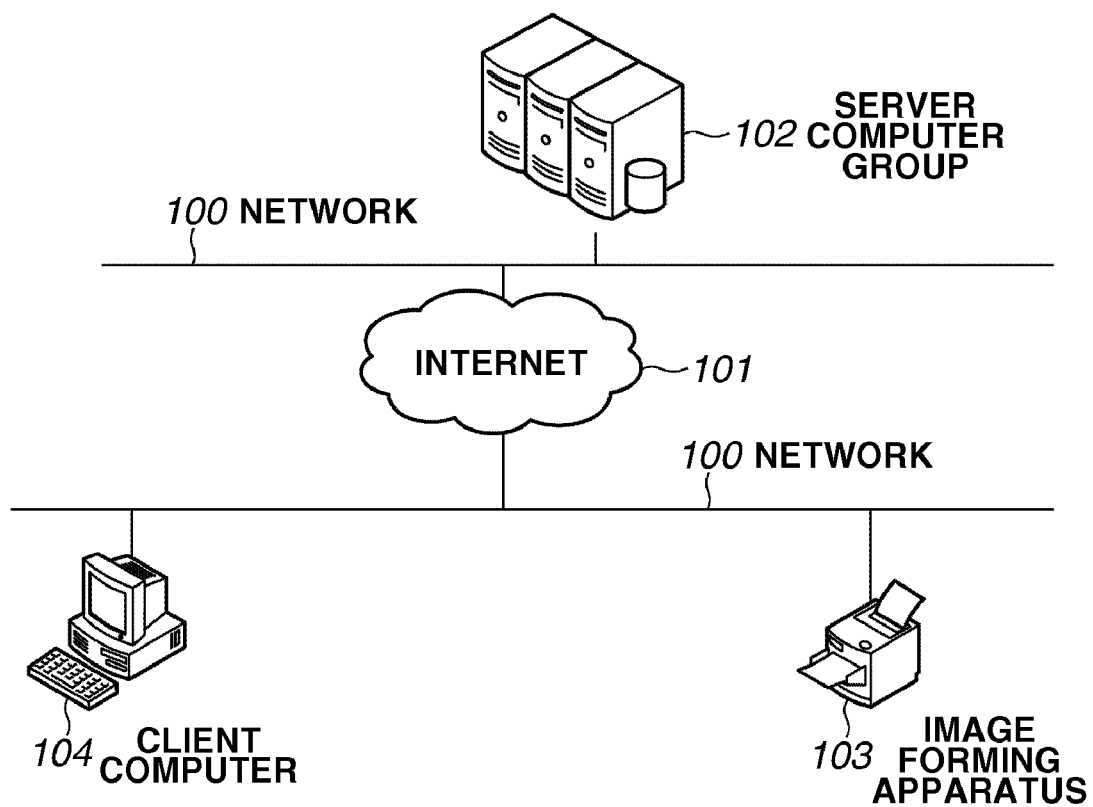
FIG. 1 illustrates an example of a system configuration of a network printing system according to an exemplary embodiment.

Each device constituting a network printing system according to a first exemplary embodiment is described below in detail with reference to FIG. 1. FIG. 1 illustrates an example of a system configuration of the network printing system.

The network printing system illustrated in FIG. 1 includes a server computer group 102, an image forming apparatus 103, and a client computer 104, which are connected to each other via a network 100.

The network 100 is a communication circuit that enables each of the above-described devices to transmit and receive information to and from another one of the above-described devices. Internet 101 is a communication circuit that enables each of the above-described apparatuses to communicate with another apparatus beyond the firewall. More specifically, the image forming apparatus 103 and the client computer 104 belong to the same network 100 and can communicate, beyond the firewall, with the server computer group 102 that belongs to another network 100 via the Internet 101.

Each of the above-described networks 100 and the Internet 101 is, for example, a wired or wireless communication network capable of supporting the TCP/IP protocols. In the first exemplary embodiment, the server computer group 102 includes a plurality of server computers, although a single server is illustrated in FIG. 1. The network printing system is an example of the cloud computing system.

Figure 2:
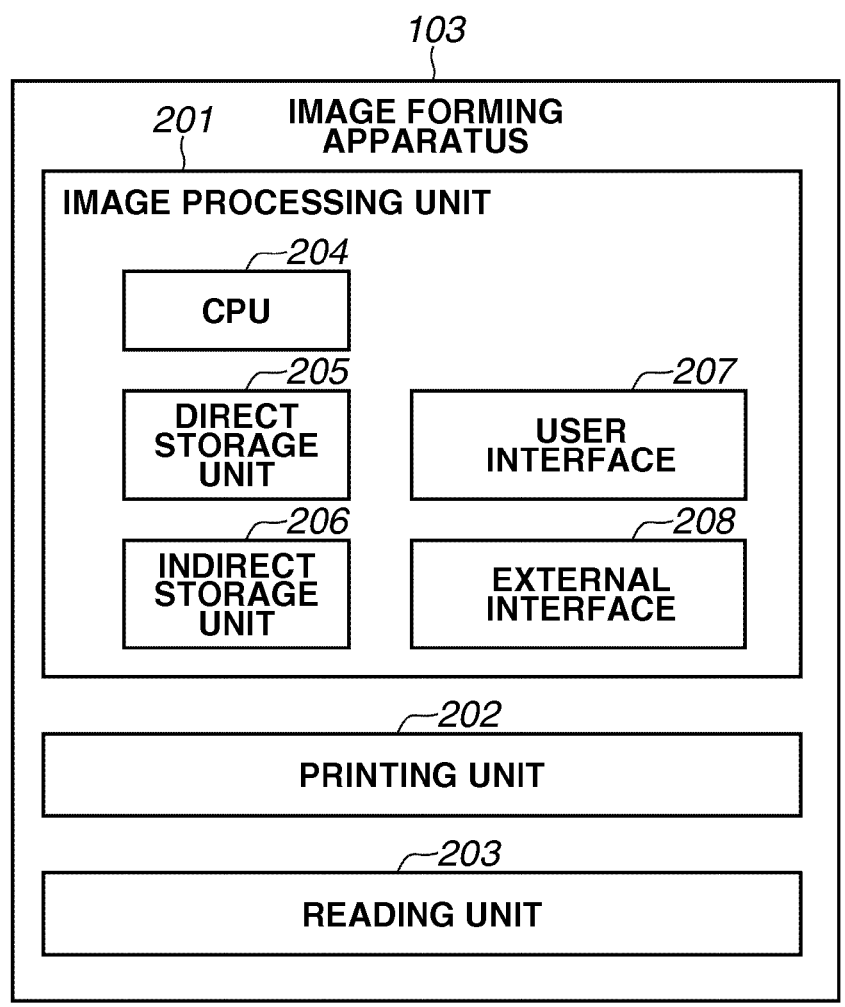
FIG. 2 illustrates an example of a hardware configuration of an image forming apparatus according to an exemplary embodiment.

Next, an internal configuration of each apparatus that constitutes the network printing system illustrated in FIG. 1 is described below in detail. First, the internal configuration of the image forming apparatus 103 is described below with reference to FIG. 2. FIG. 2 illustrates an example of a hardware configuration of the image forming apparatus 103.

The image forming apparatus 103 includes an image processing unit 201, a printing unit 202, and a reading unit 203. The image processing unit 201 includes a central processing unit (CPU) 204, a direct storage unit 205, an indirect storage unit 206, a user interface 207, and an external interface 208.

The CPU 204 can execute a predetermined program and is functionally operable as a unit configured to instruct various controls of the image forming apparatus 103. The direct storage unit 205 is a work memory to be used when the CPU 204 executes a program. The program to be executed by the CPU 204 is loaded into the direct storage unit 205.

The direct storage unit 205 can be realized by a random access memory (RAM). The indirect storage unit 206 stores various programs including application programs and a platform program.

Various programs stored in the indirect storage unit 206 can be loaded into the direct storage unit 205 when the CPU 204 executes each program. The indirect storage unit 206 can be realized by a solid state drive (SSD) or a hard disc drive (HDD). In the present exemplary embodiment, the CPU 204 can be constituted by a multi-processor.

The platform is described below in detail. If the platform is realized, a new application uniquely developed by an end-user can be executed by the image forming apparatus 103. Further, customizing an operation screen of the image forming apparatus 103 becomes feasible.

An example method for realizing the platform is described. The CPU 204 moves the platform program stored in the indirect storage unit 206 to the direct storage unit 205. Upon completion of the movement of the platform program, the CPU 204 can execute the platform program.

In the present exemplary embodiment, an operation of the CPU 204 for executing the platform program is referred to as "launching the platform." The platform can operate on the firmware of the image forming apparatus 103. The platform program can provide an environment for executing an application program described in an object-oriented manner.

An example method for executing an application program on the platform is described below in detail. In the present exemplary embodiment, print software is constantly operating on the platform to accept a print request. For example, the print software can receive print data from an external device accessible via the network according to appropriate communication protocol, such as Hyper Text Transfer Protocol (HTTP).

The print software transmits the received print data to the firmware. The firmware starts print data processing based on the received print data. If the print data does not require any processing to be performed before starting the print processing, the firmware can skip preliminary print data processing. As described above, when the platform executes the application program, a control to be performed by the image forming apparatus 103 can be realized.

An example method for executing the application program is described below. The platform, if it is launched, moves the application program stored in the indirect storage unit 206 to the direct storage unit 205. Upon completion of the movement of the application program, the platform can execute the application program. Then, the platform starts executing the application program.

In the present exemplary embodiment, the above-described function of the platform that can be provided by executing the application program is referred to as "platform application." Further, the platform can partly perform each processing of the flowchart described in the present exemplary embodiment.

The user interface 207 is a unit configured to accept a processing request from a user. For example, the user interface 207 can accept, via a keyboard and a mouse, a signal that represents an instruction input by a user.

The external interface 208 can receive data from an external device, and can transmit data to an external device. For example, the external device is an external storage device, such as an external HDD or an external USB memory, or a separate device, such as a host computer or an image forming apparatus, accessible via the network.

The image forming apparatus 103 can communicate with the client computer 104 and the server computer group 102 via the network 100 and the Internet 101.

Figure 3:
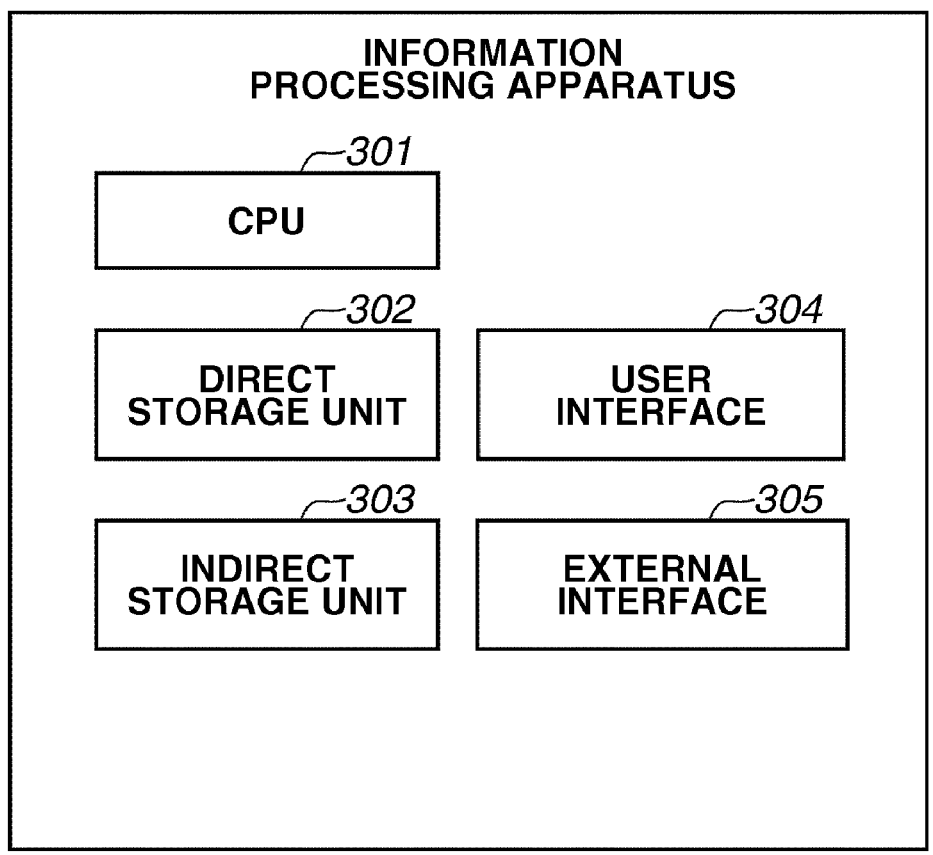
FIG. 3 is a block diagram illustrating an example of a hardware configuration of an information processing apparatus according to an exemplary embodiment.

Next, an internal configuration of an information processing apparatus, which is represented by the server computer group 102 and the client computer 104, is described below with reference to FIG. 3. FIG. 3 is a block diagram illustrating an example of a hardware configuration of the information processing apparatus. The information processing apparatus includes a CPU 301, a direct storage unit 302, an indirect storage unit 303, a user interface 304, and an external interface 305.

The user interface 304 is a unit configured to accept a processing request from a user. For example, the user interface 304 can accept, via a keyboard and a mouse, a signal that represents an instruction input by a user.

The CPU 301 can execute a predetermined program and is functionally operable as a unit configured to instruct various controls of the information processing apparatus. The direct storage unit 302 is a work memory to be used when the CPU 301 executes a program. The program to be executed by the CPU 301 is loaded into the direct storage unit 302. The direct storage unit 302 can be constituted by a RAM.

The indirect storage unit 303 stores various programs including application programs and an operating system (OS). Various programs stored in the indirect storage unit 303 can be moved to the direct storage unit 302 when the CPU 301 executes each program. The indirect storage unit 303 can be constituted by a ROM, or a HDD. The external interface 305 is connected to the network 100 so that the information processing apparatus can communicate with an external device accessible via the network 100.

Figure 4:
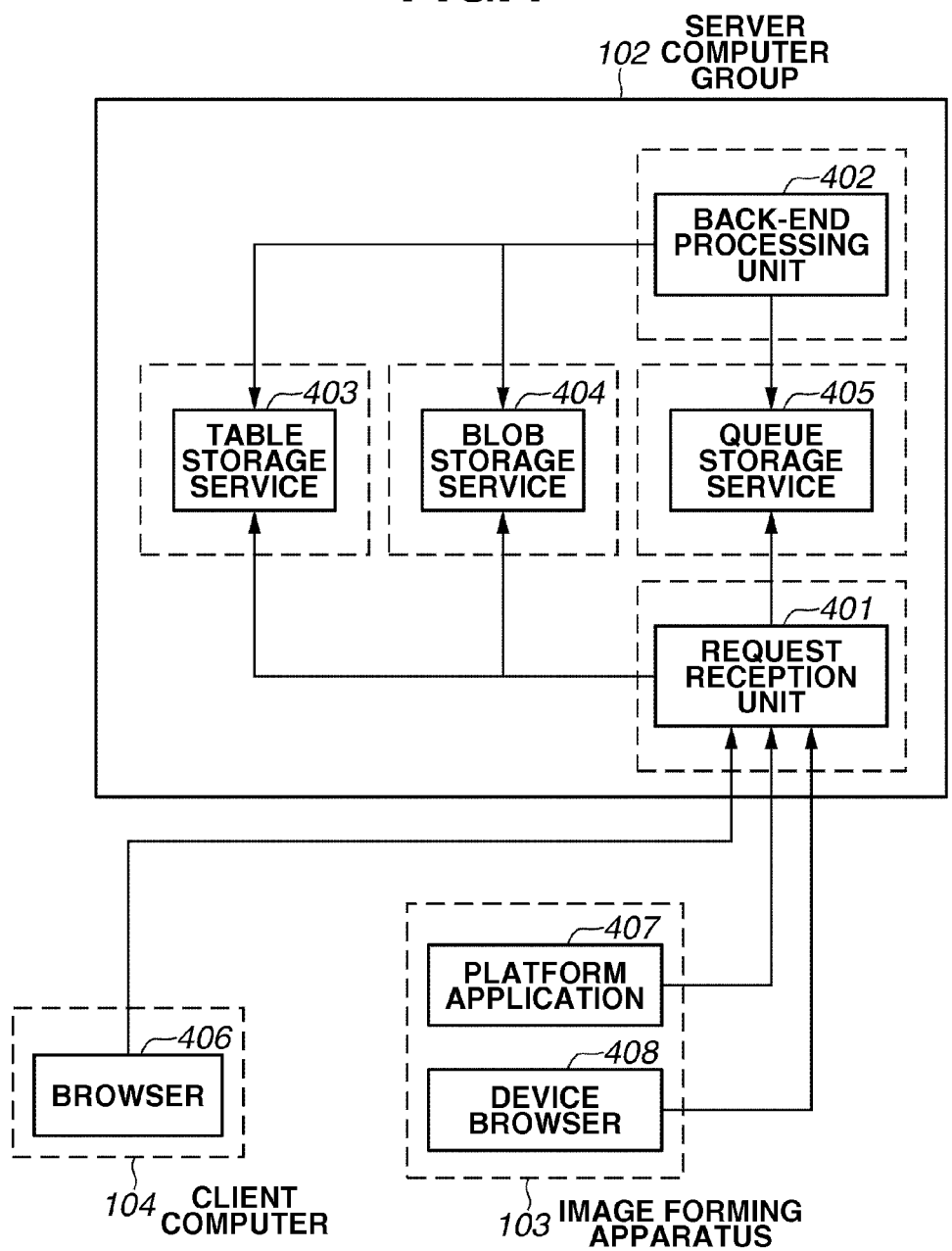
FIG. 4 is a block diagram illustrating an example of a functional configuration (software configuration) of respective apparatuses that constitute the network printing system according to an exemplary embodiment.

Next, various functions of respective apparatuses that constitute the network printing system according to the present exemplary embodiment are described below in detail with reference to FIG. 4. FIG. 4 is a block diagram illustrating an example of a functional configuration (software configuration) of respective apparatuses that constitute the network printing system.

First, functions of the server computer group 102 are described below. The server computer group 102 includes a request reception unit 401, a back-end processing unit 402, a table storage service 403, a blob storage service 404, and a queue storage service 405.

In the present exemplary embodiment, at least one server computer including the request reception unit 401, exists. Further, at least one server computer, including the back-end processing unit 402, exists. Further, at least one server computer including functions of the table storage service 403, the blob storage service 404, and the queue storage service 405, exists.

The request reception unit 401 can accept a processing request transmitted from the client computer 104 or the image forming apparatus 103. The back-end processing unit 402 can perform processing in response to each processing request using a processing program.

More specifically, to realize the back-end processing unit 402, the CPU 301 executes the processing program that can be loaded into a memory of the server computer that executes the back-end processing unit 402. To realize the request reception unit 401 and the back-end processing unit 402, the CPU 301 executes a request reception program or a back-end processing program that can be loaded into the direct storage unit 302 from the indirect storage unit 303 illustrated in FIG. 3.

The table storage service 403 is functionally operable to store data, such as path information of a module to be used by the back-end processing unit 402. To realize the table storage service 403, the CPU 301 executes a table storage service program loaded into the direct storage unit 302 from the indirect storage unit 303 illustrated in FIG. 3. Further, the data can be stored in the indirect storage unit 303.

The blob storage service 404 is functionally operable to store various data including a module to be used by the back-end processing unit 402. To realize the blob storage service 404, the CPU 301 executes a blob storage service program loaded into the direct storage unit 302 from the indirect storage unit 303 illustrated in FIG. 3. Further, the data can be stored in the indirect storage unit 303.

The queue storage service 405 has the following functions. First, the queue storage service 405 is functionally operable to enable the request reception unit 401 and the back-end processing unit 402 to perform asynchronous data communications. Second, the queue storage service 405 is functionally operable to bring a queue message added to a queue into an invisible state or into a visible state.

The first function of the queue storage service 405 is described below. The request reception unit 401 and the back-end processing unit 402 can communicate with each other according to the following method. First, if the request reception unit 401 receives a processing request from a user, the request reception unit 401 creates a ticket (which is referred to as queue message) according to the processing request received from the user. The queue message is stored in a queue by the request reception unit 401.

The back-end processing unit 402 acquires the queue message from the queue. The back-end processing unit 402 processes the processing request received from the user with reference to the acquired queue message. Thus, the processing request received from the user is solved. As described above, the request reception unit 401 and the back-end processing unit 402 can perform asynchronous communications using the queue storage service 405. The first function is described below in more detail. The second function is also described below.

To realize the queue storage service 405, the CPU 301 executes a queue storage service program that can be loaded into the direct storage unit 302 from the indirect storage unit 303 illustrated in FIG. 3. Further, the data can be stored in the indirect storage unit 303.

In addition to the foregoing description, functions of the server computer group 102 are described below in more detail.

A document server has the following functions. The document server is functionally operable as a document repository. The document repository can be realized by the indirect storage unit 303 illustrated in FIG. 3. For example, the document repository stores contents of a print instruction entered by a user via the client computer 104 or the image forming apparatus 103. The contents stored in the document repository include the following contents in addition to preliminarily stored contents.

In the present exemplary embodiment, a user can generate contents, via a browser 406, using an application operable on the server computer group 102. Thus, the user can easily obtain a print product based on contents generated using an application operable on the server computer group 102, without installing any application on the client computer 104.

The above-described applications operable on the server computer group 102 are various applications that include a document creation application, an image forming application, and a form management application. These applications are stored in the indirect storage unit 303 illustrated in FIG. 4. If execution of an application is instructed, the application can be loaded into the direct storage unit 302 from the indirect storage unit 303 and executed by the CPU 301.

Next, the image forming apparatus 103 is described below in detail. The image forming apparatus 103 includes two functions of a device browser 408 and a platform application 407. The device browser 408 is functionally operable to enable users to browse data and information stored in a device accessible via the network 100.

To realize the device browser 408, the CPU 204 executes a device browser program that can be loaded into the direct storage unit 205 from the indirect storage unit 206 illustrated in FIG. 2. Further, users can instruct printing of content via the device browser 408. The device browser 408 is, for example, a web browser.

The platform application 407 is capable of providing various services. The platform application 407 can be realized by an application program operable on the platform.

In the present exemplary embodiment, the platform application 407 can provide a print software service. As described above, the print software service can transmit received print data to the firmware. Further, the print software service requests the request reception unit 401 to confirm whether the generation of print data has been completed. In this case, the print software service performs the above-described confirmation processing based on a job ID generated by the request reception unit 401.

Next, the client computer 104 is described below in detail. The client computer 104 is functionally operable as the browser 406. The browser 406 enables users to browse data and information stored in a device accessible via the network 100. To realize the browser 406, the CPU 301 executes a browser program that can be loaded into the direct storage unit 302 from the indirect storage unit 303 illustrated in FIG. 3. The browser 406 is, for example, a web browser.

Respective apparatuses that constitute the network printing system according to the present exemplary embodiment have the above-described functions.

Figure 5:
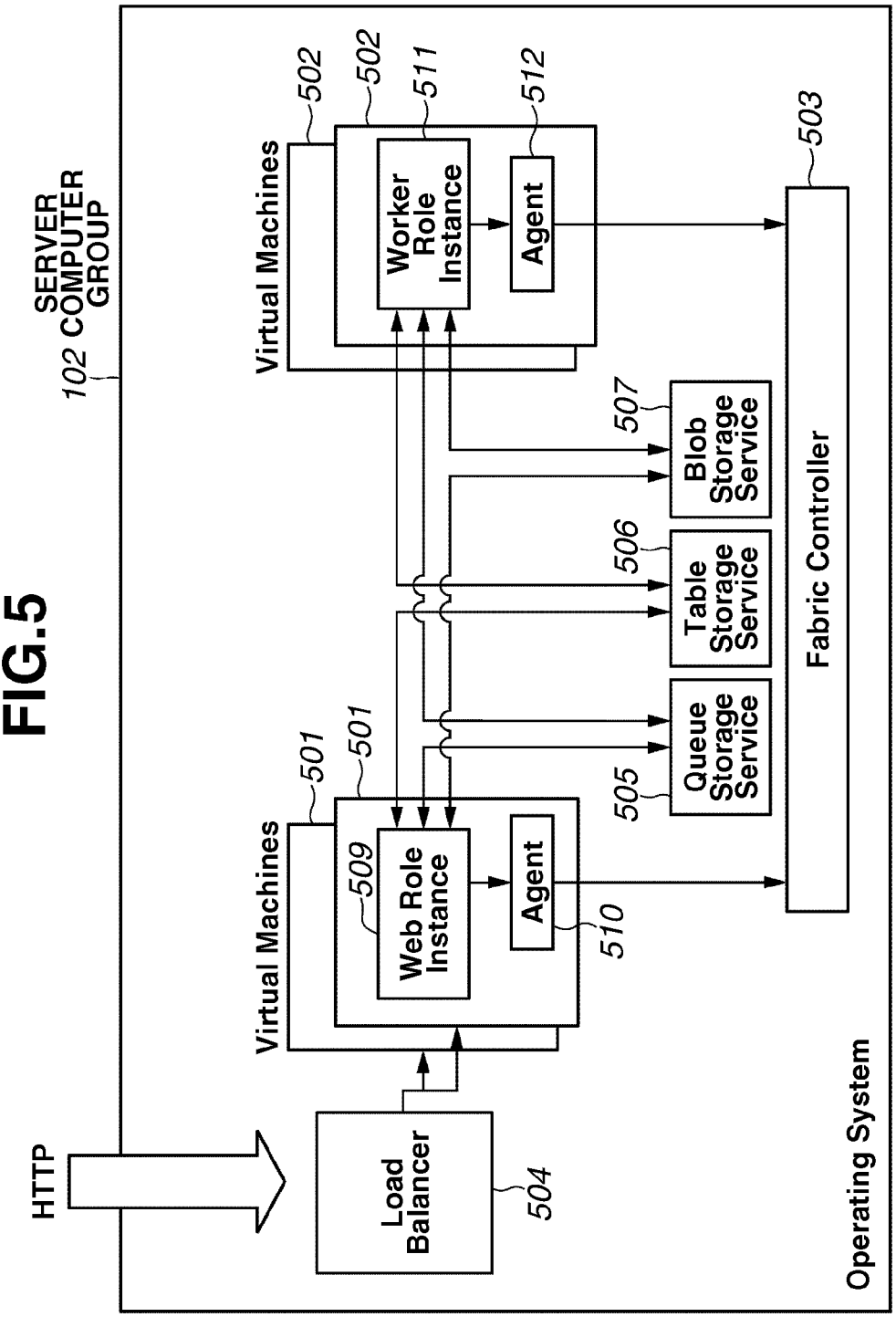
FIG. 5 is a block diagram illustrating an example of a functional configuration of a server computer group according to an exemplary embodiment.

Next, a platform system of the server computer group 102 is described below in detail with reference to FIG. 5. FIG. 5 illustrates an example of a functional configuration of the server computer group 102.

A physical hardware resource in the server computer group 102 can be used to constitute a platform of the server computer group 102. A platform user of the server computer group 102 can use the physical hardware resource of the server computer group 102 as a computing resource.

The platform system (i.e., an operating system) of the server computer group 102 has various functions, including virtual machines 501 and 502, a fabric controller 503, a load balancer 504, a queue storage service 505, a table storage service 506, and a blob storage service 507.

The platform system operable on the server computer group 102 includes a plurality of virtual machines 501 and 502. Each virtual machine is a logical computer that can be obtained by dividing the server computer group 102 (i.e., a physical device) using a virtualization technique. Each virtual machine can perform various operations according to an independent operating system.

Each logical computer can be counted as one "instance." In the present exemplary embodiment, one virtual machine (i.e., the number of instances=1) operates on one server computer that constitutes the server computer group 102.

The virtual machine 501 includes a request reception unit (Web Role Instance) 509 and a request reception unit agent (Agent) 510. The request reception unit 509 can receive, via the load balancer 504, a processing request entered by a user. Further, the request reception unit 509 can transmit, via the queue storage service 505, the processing request to a back-end processing unit 511.

To secure higher availability of the request reception unit 509, a request from an external network (i.e., HTTP based communication in the present exemplary embodiment) is performed via the load balancer 504 that is positioned outside of the virtual machine 501. The load balancer 504 can integrally manage requests received from the external network and selectively transfer respective requests to a plurality of virtual machines each including a request reception unit having a comparable function.

The request reception unit agent 510 can collect various types of information, including the usage status of the virtual machine 501, the operational state of the request reception unit 509, the resource usage status of the virtual machine 501, and the error of the request reception unit 509. The request reception unit agent 510 can periodically transmit the collected information to the fabric controller 503.

The fabric controller 503 manages each instance in the request reception unit 509 and the back-end processing unit 511. Therefore, expandability and availability of each instance can be assured.

For example, it is assumed that a specific instance has stopped due to a server failure in the request reception unit 509 or the back-end processing unit 511. In this case, the fabric controller 503 cannot receive notifications periodically sent from the request reception unit agent 510 and the back-end processing unit agent 512.

If the fabric controller 503 cannot receive a periodic notification, the fabric controller 503 instructs the virtual machine to transfer the processing to a new instance. As a result, the present exemplary embodiment can maintain the number of instances that are executing the processing at a predetermined level, and can prevent the processing from being delayed.

Further, the request reception unit 509 of the virtual machine 501 can instruct the fabric controller 503 to generate and launch an instance of the back-end processing unit 511 of the virtual machine 502, as described below in more detail.

The virtual machine 502 includes the back-end processing unit (WorkerRole Instance) 511 and the back-end processing unit agent (Agent) 512. The back-end processing unit 511 can receive a processing request from the request reception unit 509 via the queue storage service 505.

The back-end processing unit 511 can execute the processing request received from the request reception unit 509 via the queue storage service 505. Further, the back-end processing unit 511 is capable of performing scale-out processing to increase the number of virtual machines 502 and the number of instances in the back-end processing unit 511.

If the number of instances in the back-end processing unit 511 increases, the data processing amount per back-end processing unit decreases. Thus, the back-end processing unit 511 can quickly return a result responding to the processing request received from the user.

The queue storage service 505 can provide a service for enabling the request reception unit 509 and the back-end processing unit 511 to perform asynchronous data communications. The request reception unit 509 and the back-end processing unit 511 send various instructions to the queue storage service 505 to perform asynchronous data communications, as described below in detail.

A queue message addition instruction is an example instruction supplied from the request reception unit 509 to the queue storage service 505. A queue message acquisition instruction and a queue message deletion instruction are example instructions supplied from the back-end processing unit 511 to the queue storage service 505.

The request reception unit 509 and the back-end processing unit 511 perform sequential operations for asynchronously data communications in the following manner.

The request reception unit 509 generates a queue message according to a processing request received from the user, and transmits an addition instruction to the queue storage service 505. If the queue storage service 505 receives the addition instruction, the queue storage service 505 adds the queue message to a queue.

The back-end processing unit 511 sends an acquisition instruction to the queue storage service 505 to acquire the queue message. If the queue storage service 405 receives the acquisition instruction, the queue storage service 405 returns the queue message, a message ID uniquely allocated to each queue message, and a job ID, as a response to the acquisition instruction, to the back-end processing unit 511.

The message ID is unique information allocated to each queue message (i.e., information identifying each queue message). When the back-end processing unit 511 has completed the processing, the back-end processing unit 511 can use the message ID to instruct deletion of the queue message.

The job ID can be referred to as information capable of uniquely identifying the content to be actually processed. If the back-end processing unit 511 completes the processing request, the back-end processing unit 511 instructs the queue storage service 505 to delete the queue message corresponding to the received ID. If the queue storage service 505 receives the deletion instruction, the queue storage service 505 deletes the queue message corresponding to the reception ID instructed by the back-end processing unit 511 from the queue. Thus, the present exemplary embodiment can prevent the same queue message from being redundantly processed by a back-end processing unit 511 other than the back-end processing unit 511 having output the deletion instruction.

Further, the queue storage service 505 is functionally operable to bring a queue message added to a queue into an invisible state or into a visible state. The invisible state indicates that, if acquisition of a queue message added to a queue is requested by the back-end processing unit 511, the queue storage service 505 does not deliver any queue message to the back-end processing unit 511.

If the back-end processing unit 511 acquires a queue message from a queue, the queue storage service 505 brings the acquired queue message into an invisible state. The visible state indicates that, if acquisition of a queue message added to a queue is requested by the back-end processing unit 511, the queue storage service 505 delivers the queue message to the back-end processing unit 511.

The queue message acquired by the back-end processing unit 511 and brought into the invisible state, if a processing result is not returned from the back-end processing unit 511 that is currently performing the processing, is automatically brought into a visible state by the queue storage service 405. Thus, a retrial of the processing is automatically executed even when the back-end processing unit 511 abnormally terminates the processing and cannot continue the processing.

The table storage service 506 can provide a storage that can be used to store data. The table storage service 506 can store each data as a simple combination of entity and type information property. Each table stores properties of PartitionKey columns and RowKey columns. Each entity in the table can be identified with a combination of PartitionKey and RowKey as a key.

The blob storage service 507 can provide a storage that can be used to store data. The blob storage service 507 can provide a function of storing an assembly of binary data. The blob storage service 507 stores a module, as binary data, to be used by the back-end processing unit 511 in the present exemplary embodiment.

Next, an example distribution to an individual request reception unit according to the present exemplary embodiment, which can be performed by the request reception unit, is described below.

Figure 6:
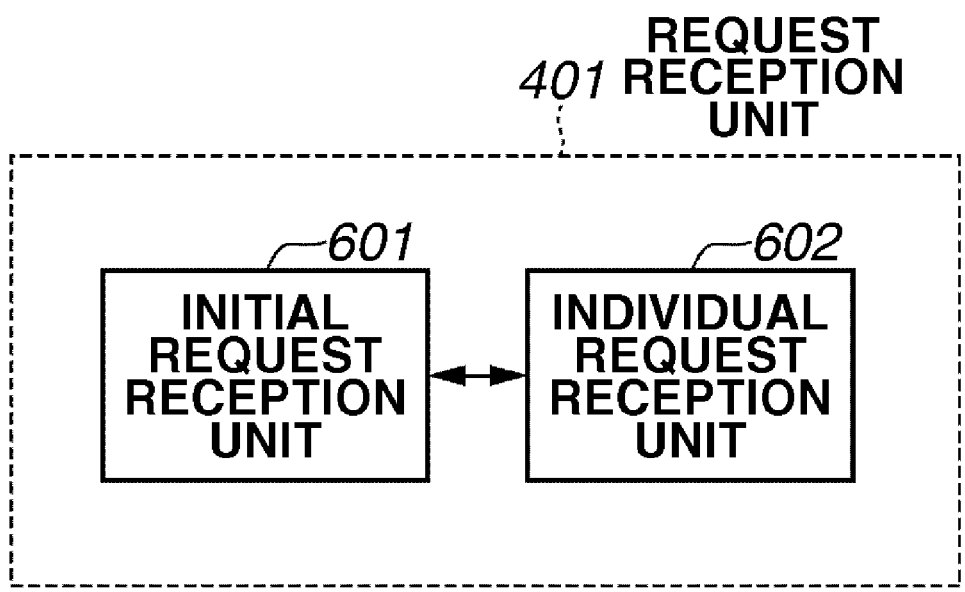
FIG. 6 is a block diagram illustrating an example of a configuration of a request reception unit according to an exemplary embodiment.

FIG. 6 is a block diagram illustrating an example of a configuration of the request reception unit 401. An initial request reception unit 601 can accept a processing request transmitted from the image forming apparatus 103. Then, the initial request reception unit 601 sends a redirect statement to the individual request reception unit 602 according to information illustrated in FIG. 7A and FIG. 7B. The individual request reception unit 602 is functionally operable to accept a processing request transmitted from the image forming apparatus 103.

FIG. 7A illustrates an example of a device registration table. The device registration table can be stored in the table storage service 506. The browser 406 of the client computer 104 registers the device registration table beforehand in the table storage service 403 to identify a service of each individual request reception unit used by each image forming apparatus 103.

The device registration table illustrated in FIG. 7A includes a device_id 701 (i.e., one of the PartitionKey columns) that represents a unique identifier of each image forming apparatus 103 connected to the network printing system according to the present exemplary embodiment. The device registration table illustrated in FIG. 7A further includes a site_id 702 (i.e., one of the RowKey columns) that represents an identifier of the individual request reception unit 602 in the network printing system according to the present exemplary embodiment.

The device registration table illustrated in FIG. 7A further includes a service_id 703 that represents an identifier of each service that can be used by the image forming apparatus 103 in the network printing system according to the present exemplary embodiment. According to the example illustrated in FIG. 7A, each record can be defined by values of respective items 701 to 703. For example, in the first row of the device registration table, the device_id 701 is "dev_a_sr8rIheJmCd6npd", the site_id 702 is "site_0001", and the service_id 703 is "print."

FIG. 7B illustrates an example of an individual request reception unit management table. The individual request reception unit management table can be stored in the table storage service 506. The browser 406 of the client computer 104 registers the individual request reception unit management table beforehand in the table storage service 403 to identify URI of each individual request reception unit in relation to each site_id.

The individual request reception unit management table illustrated in FIG. 7B includes a pertition_key 711 that stores a fixed value "site." The individual request reception unit management table further includes a site_id 712 (i.e., one of the RowKey columns) that represents an identifier of the individual request reception unit 602. In this respect, the site_id 712 is similar to the above-described site_id 702. The individual request reception unit management table further includes a URI 713 that represents URI of the individual request reception unit 602 relating to the site_id 712. According to the example illustrated in FIG. 7B, each record can be defined by values of respective items 711 to 713. For example, in the first row of the individual request reception unit management table, the pertition_key 711 is "site", the site_id 712 is "site 0001", and the URI 713 is "http://server01."

FIG. 7C illustrates an example of a service instance management table. The service instance management table illustrated in FIG. 7C can be stored in the table storage service 506. The service instance management table is provided for each individual request reception unit 602 to manage the number of instances with respect to the WorkerRole instance 511 of the back-end processing unit 402 that provides a service corresponding to the model of each image forming apparatus 103.

The service instance management table illustrated in FIG. 7C includes a model_id 721 (i.e., one of the PartitionKey columns) that represents a model identifier of each image forming apparatus 103. The service instance management table illustrated in FIG. 7C further includes a service_id 722 (i.e., one of the RowKey columns) that represents an identifier of each service that can be used by the image forming apparatus 103. In this respect, the service_id 722 is similar to the above-described service_id 703.

The service instance management table illustrated in FIG. 7C includes an instance 723 that represents the number of instances with respect to the WorkerRole instance 511 of the back-end processing unit 402 that provides services dedicated to the model of each image forming apparatus 103. According to the example illustrated in FIG. 7C, each record can be defined by values of respective items 721 to 723. For example, in the first row of the service instance management table, the model_id 721 is "model_a0001", the service_id 722 is "print", and the instance 723 is "1."

FIG. 7D illustrates an example of a module path management table. The module path management table can be stored in the table storage service 506. The browser 406 of the client computer 104 registers the module path management table beforehand in the table storage service 403 to manage a path (storage location) of a module loaded by the WorkerRole instance 511 of the back-end processing unit 402 that provides services corresponding to the model of each image forming apparatus 103.

The module path management table illustrated in FIG. 7D includes a model_id 731 (i.e., one of the PartitionKey columns) that represents a model identifier of each image forming apparatus 103. In this respect, the model_id 731 is similar to the above-described model_id 721. The module path management table illustrated in FIG. 7D further includes a service_id 732 (i.e., one of the RowKey columns) that represents an identifier of each service that can be used by the image forming apparatus 103. In this respect, the service_id 732 is similar to the above-described service_id 703.

The module path management table illustrated in FIG. 7D includes a path 733 that represents a path (storage location) of a module loaded by the WorkerRole instance 511 of the back-end processing unit 402 that provides services corresponding to the model of each image forming apparatus 103. The path is a storage location on the blob storage service 404. The entity of the module is stored on the blob storage service 404.

According to the example illustrated in FIG. 7D, each record can be defined by values of respective items 731 to 733. For example, in the first row of the module path management table, the model_id 731 is "model_a0001", the service_id 732 is "print", and the path 733 is "lib/print/a0001."

FIG. 8 illustrates an example of a setting file for the image forming apparatus 103. The setting file illustrated in FIG. 8 can be stored in the indirect storage unit 206 of the image forming apparatus 103. One of setting values is URI information of a connection destination to be connected when the image forming apparatus 103 uses a service of the present exemplary embodiment. According to the example illustrated in FIG. 8, a setting item "Connect_URI" 801 is the connection destination URI. A setting value of the connection destination URI is "http://server/first."

FIG. 9 illustrates an example of an http header to be transmitted from the image forming apparatus 103 to the URI defined by the setting value of the connection destination URI 801 illustrated in FIG. 8. The device browser 408 of the image forming apparatus 103 outputs the http header, and the initial request reception unit 601 of the request reception unit 401 receives the http header.

The http header includes information indicating a device ID 901. The device ID 901 is uniquely allocated to each image forming apparatus 103 and can be stored in the indirect storage unit 206 of the image forming apparatus 103. In the present exemplary embodiment, an item "X-device-id" represents the device ID 901. An example value of the item "X-device-id" is "dev_a_sr8rIheJmCd6npd."

Figure 10:
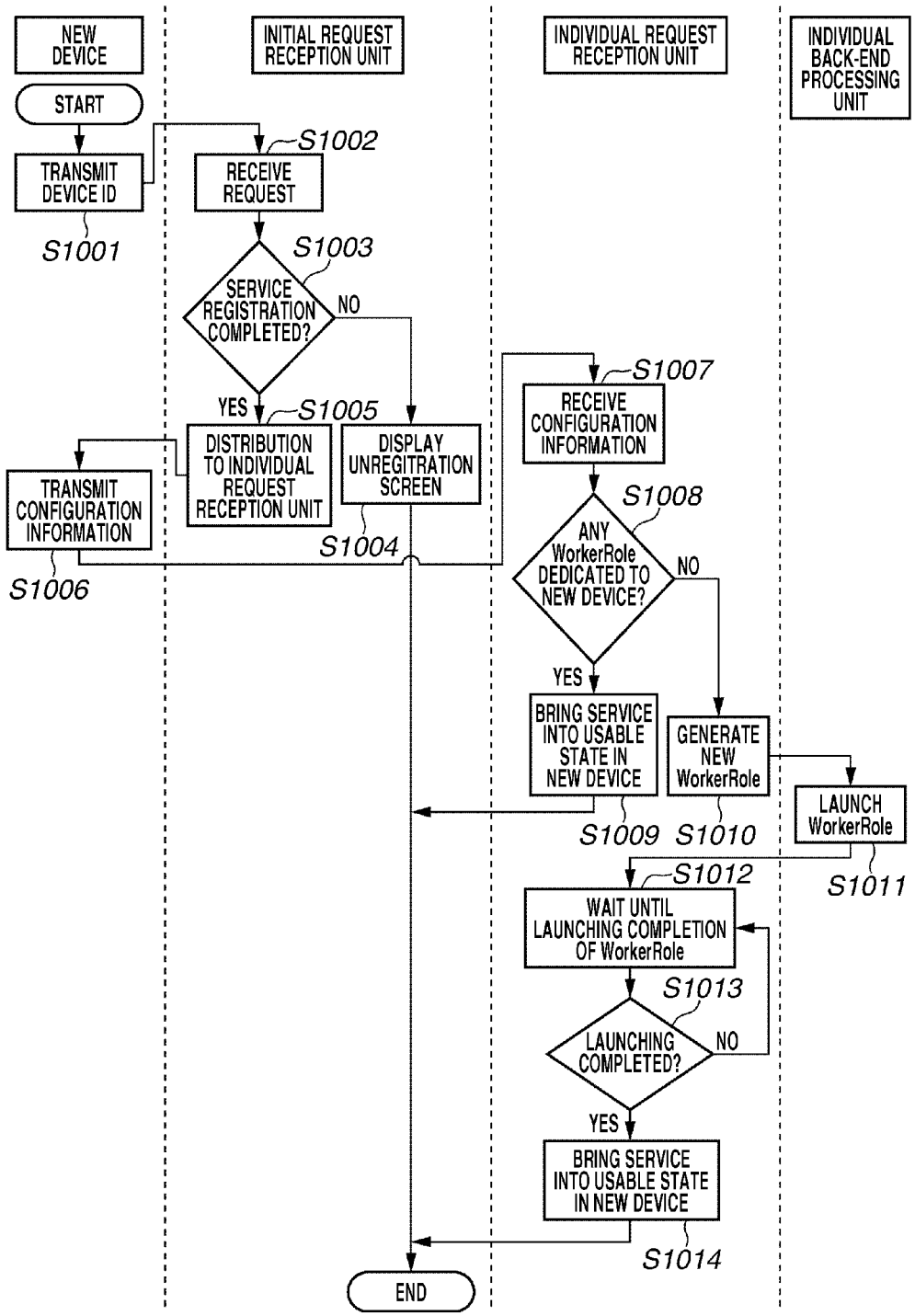
FIG. 10 is a flowchart illustrating an example of processing to be performed by the image forming apparatus that accesses the request reception unit and starts using a service according to an exemplary embodiment.

Next, an example processing flow of the image forming apparatus 103 that accesses the request reception unit 401 to use a service (an example of a device connection method for connecting a device to a cloud computing system that includes a group of server computers) is described below with reference to FIG. 10. FIG. 10 is a flowchart illustrating an example of processing to be performed by the image forming apparatus 103 that accesses the request reception unit 401 and starts using a service.

In step S1001, the device browser 408 of the image forming apparatus 103 accesses the initial request reception unit 601 of the request reception unit 401 according to a setting value of the connection destination URI 801 described with reference to FIG. 8. Then, the device browser 408 transmits the device ID 901 described with reference to FIG. 9 in addition to a connection request. The connection destination URI 801 and the device ID 901 can be acquired from the indirect storage unit 206 of the image forming apparatus 103 when the device browser 408 is launched. In step S1002, the initial request reception unit 601 receives the connection request transmitted in step S1001, and acquires the device ID 901.

In step S1003, the initial request reception unit 601 determines whether the device ID 901 acquired in step S1002 coincides with any one of IDs in the device registration table described with reference to FIG. 7A. If the determination result in step S1003 is No, the initial request reception unit 601 determines that the image forming apparatus 103 is not registered. Then, in step S1004, the initial request reception unit 601 transmits an unregistration screen to the device browser 408 of the image forming apparatus 103. If the determination result in step S1003 is Yes, the initial request reception unit 601 determines that the image forming apparatus 103 is already registered and the processing proceeds to step S1005.

In step S1005, the initial request reception unit 601 acquires ID of the individual request reception unit 602 and a usable service ID from the device registration table described with reference to FIG. 7A. Further, the initial request reception unit 601 acquires a corresponding URI from the individual request reception unit management table illustrated in FIG. 7B. The initial request reception unit 601 sends a redirect statement including the usable service ID to the device browser 408 of the image forming apparatus 103. In the present exemplary embodiment, the service ID is an example of service identification information to be required to identify each service.

In step S1006, the device browser 408 of the image forming apparatus 103 reads a model ID of the image forming apparatus 103 from the indirect storage unit 206, and transmits the readout model ID together with the usable service ID redirected in step S1005 to the individual request reception unit 602 (i.e., redirect destination). The model ID is, for example, an example of configuration information or model information.

In step S1007, the individual request reception unit 602 receives the model ID and the service ID transmitted in step S1006.

In step S1008, the individual request reception unit 602 determines whether a corresponding service instance is already present in the service instance management table (i.e., a table to be used to manage the number of services) described with reference to FIG. 7C based on the model ID and the service ID received in step S1007.

If the determination result in step S1008 is Yes, then in step S1009, the individual request reception unit 602 determines that generation of a new instance is not required, and transmits a preparation completion screen to the device browser 408 of the image forming apparatus 103. As a result of the above-described processing, the image forming apparatus 103 can use the registration completed service.

If the determination result in step S1008 is No, then in step S1010, the individual request reception unit 602 determines that generation of a new instance is required, and instructs the fabric controller 503 to generate the WorkerRole instance 511 (i.e., the entity of the back-end processing unit 402). An example of an instance generation instruction is described below.

In step S1011, the individual request reception unit 602 outputs an instruction to launch the WorkerRole instance 511 (i.e., the entity of the back-end processing unit 402) generated by the fabric controller 503. An example of an instance launching instruction is described below.

In step S1012, the individual request reception unit 602 waits until the instructed launching of the WorkerRole instance 511 is completed.

In step S1013, the individual request reception unit 602 causes the fabric controller 503 to determine whether the instructed launching of the WorkerRole instance 511 has been completed.

If the determination result in step S1013 is No, it indicates that the instructed launching of the WorkerRole instance 511 is not yet completed. Therefore, the processing returns to step S1012 in which the individual request reception unit 602 waits until the instructed launching of the WorkerRole instance 511 is completed. If the determination result in step S1013 is Yes, it indicates that the instructed launching of the WorkerRole instance 511 is already completed. Therefore, in step S1014, the individual request reception unit 602 transmits the preparation completion screen to the device browser 408 of the image forming apparatus 103.

As a result of the above-described processing, the image forming apparatus 103 can use the registration completed service. The preparation completion screen is an example of a usage preparation completion screen.

Next, example processing that can be performed by the individual request reception unit 602, which causes the fabric controller 503 to generate the WorkerRole instance 511 (i.e., the entity of the back-end processing unit 402), is described below with reference to FIG. 11A, FIG. 11B, and FIG. 12.

FIG. 11A illustrates an example of a configuration file that can be stored by the back-end processing unit 402. The configuration file is stored in the indirect storage unit 303 of a server computer that executes the back-end processing unit 402. The configuration file illustrated in FIG. 11A includes setting items of the back-end processing unit 402. According to an illustrated item 1101, an example setting item is "ModuleKey."

FIG. 11B illustrates an example of a setting file that can be stored in the back-end processing unit 402. The setting file is stored in the indirect storage unit 303 of a server computer that executes the back-end processing unit 402. The setting file illustrated in FIG. 11B includes an example value of the setting item of the back-end processing unit 402 described with reference to FIG. 11A. According to an illustrated item 1102, an example setting value of the item "ModuleKey" is "model_a0001|print."

Figure 12:
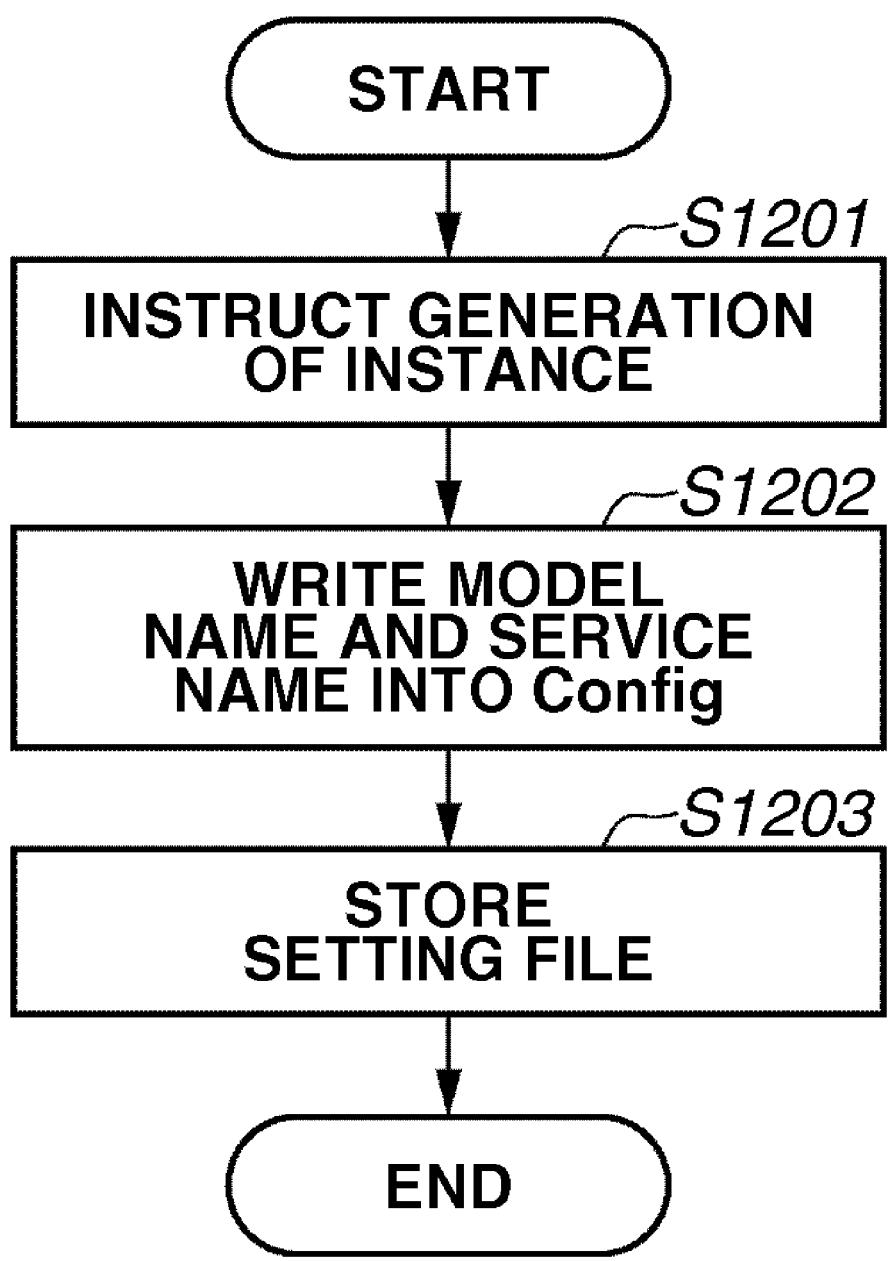
FIG. 12 is a flowchart illustrating an example of processing for generating a WorkerRole instance (i.e., processing to be performed in step S1010 illustrated in FIG. 10) according to an exemplary embodiment.

FIG. 12 is a flowchart illustrating an example of processing for generating the WorkerRole instance 511 (i.e., the processing to be performed in step S1010 illustrated in FIG. 10).

In step S1201, the individual request reception unit 602 sends a generation instruction of the WorkerRole instance 511 to the fabric controller 503. In response to the received instruction, the fabric controller 503 generates a corresponding (e.g., Print or Scan) WorkerRole instance 511 of the back-end processing unit 402 as a subordinate instance belonging to the individual request reception unit 602 that has output the generation instruction. In other words, the fabric controller 503 generates a corresponding virtual machine 502.

In step S1202, the individual request reception unit 602 causes the fabric controller 503 to update a setting file of the generated back-end processing unit 402. More specifically, the individual request reception unit 602 writes a value of the "ModuleKey" into the setting file (see FIG. 11B).

In step S1203, the individual request reception unit 602 causes the fabric controller 503 to store the setting file updated in step S1202. Generation of the WorkerRole instance 511 can be realized though the above-described processing.

FIG. 13 is a flowchart illustrating an example of processing for launching the WorkerRole instance 511 (i.e., the processing to be performed in step S1011 illustrated in FIG. 10).

If the instance generation processing illustrated in FIG. 12 is terminated, then in step S1301, the fabric controller 503 instructs the launching of the WorkerRole instance 511.

In step S1302, the WorkerRole instance 511 (i.e., the instance having been instructed to launch in step S1301) reads the configuration file described with reference to FIG. 11A and the setting file described with reference to FIG. 11B.

In the present exemplary embodiment, the WorkerRole instance 511 reads the setting value of the "ModuleKey" from the setting file and acquires information indicating a path that stores a corresponding module from the module path management table described with reference to FIG. 7D.

Further, the WorkerRole instance 511 reads a module included in the path information acquired from the blob storage service 404, and loads the readout module.

In step S1303, the fabric controller 503 detects launching completion of the WorkerRole instance 511.

Figure 14A:
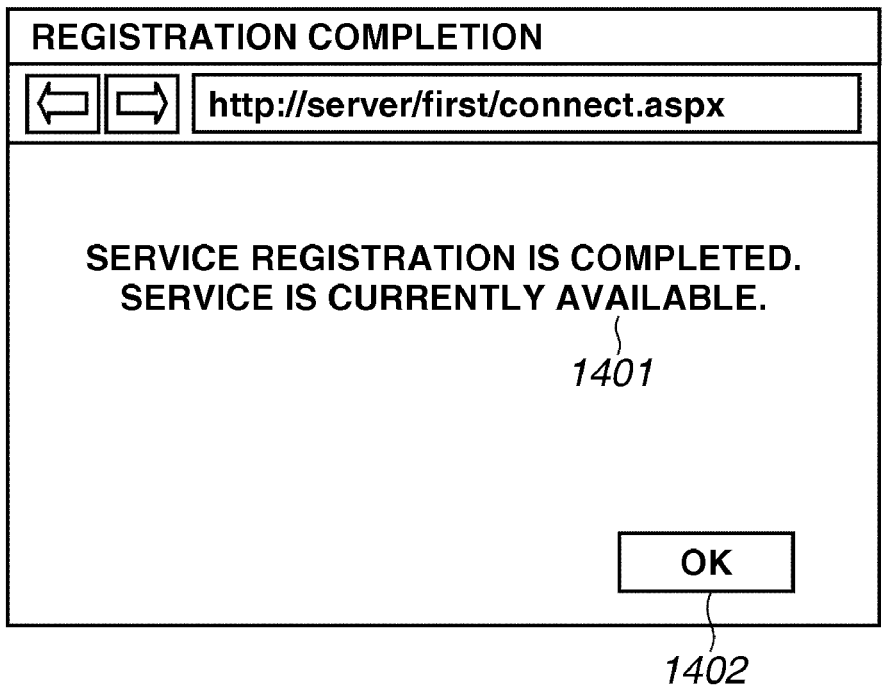
FIG. 14A illustrates an example of a preparation completion screen according to an exemplary embodiment.

FIG. 14A illustrates an example of the preparation completion screen, which notifies usage preparation completion of the service, to be displayed after the image forming apparatus 103 is successfully connected to the network printing system. The preparation completion screen illustrated in FIG. 14A can be displayed on the device browser 408 of the image forming apparatus 103 according to the present exemplary embodiment.

The preparation completion screen illustrated in FIG. 14A includes a field 1401 of a message that notifies a user of completion of the service registration. A button 1402 can be displayed on the device browser 408 of the image forming apparatus 103. If a user operation is accepted, the device browser 408 goes back to the previous screen.

Figure 14B:
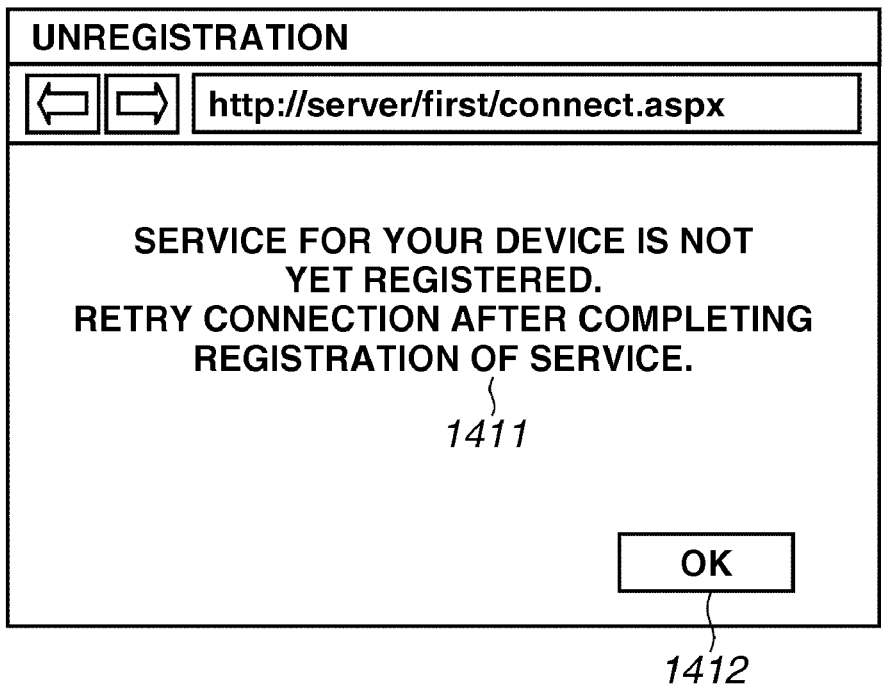
FIG. 14B illustrates an example of an unregistration notification screen according to an exemplary embodiment.

FIG. 14B illustrates an example of an unregistration notification screen, which notifies incompletion of the service usage registration with respect to the image forming apparatus 103, to be displayed after the image forming apparatus 103 is connected to the network printing system. More specifically, the unregistration notification screen is usable when the intended service is not present in the device registration table illustrated in FIG. 7A. The unregistration notification screen illustrated in FIG. 14B can be displayed on the device browser 408 of the image forming apparatus 103 according to the present exemplary embodiment.

The unregistration notification screen illustrated in FIG. 14B includes a field 1411 of an error message that notifies a user of incomplete registration of the service. A button 1412 can be displayed on the device browser 408 of the image forming apparatus 103. If a user operation is accepted, the device browser 408 goes back to the previous screen.

Through the above-described processing, the back-end processing unit 402 can be automatically generated and launched when an image forming apparatus 103 is newly added to the network printing system. Therefore, the present exemplary embodiment can reduce the time and labor required before the network printing system becomes available, and can improve the easiness in installation.

In a second exemplary embodiment, the network printing system performs replacement processing for newly adding an image forming apparatus 103 to the system. The replacement processing includes deleting the WorkerRole instance 511 that corresponds to a replacement target (i.e., the image forming apparatus 103 to be replaced) after a WorkerRole instance 511 corresponding to the newly added image forming apparatus 103 is generated and launched.

FIG. 15 illustrates an example of a replacement information added device registration table. The replacement information added device registration table can be stored in the table storage service 506. The table illustrated in FIG. 15 is similar to the table illustrated in FIG. 7A. The browser 406 of the client computer 104 registers the replacement information added device registration table beforehand in the table storage service 403 to identify a service of each individual request reception unit used by each image forming apparatus 103.

In addition, information indicating a replacement of the image forming apparatus 103 is registered in the replacement information added device registration table.

The replacement information added device registration table illustrated in FIG. 15 includes a device_id 1501 (i.e., one of the PartitionKey columns) that represents a unique identifier of each image forming apparatus 103 connected to the network printing system according to the present exemplary embodiment. The replacement information added device registration table illustrated in FIG. 15 further includes a site_id 1502 (i.e., one of the RowKey columns) that represents an identifier of the individual request reception unit 602 in the network printing system according to the present exemplary embodiment.

The replacement information added device registration table illustrated in FIG. 15 further includes a service_id 1503 that represents an identifier of each service that can be used by the image forming apparatus 103 in the network printing system according to the present exemplary embodiment. The items 1501 to 1503 are similar to the above-described items 701 to 703 described with reference to FIG. 7A.

The replacement information added device registration table illustrated in FIG. 15 further includes a replace_device_id 1504 that represents an identifier of a target image forming apparatus 103 to be replaced. The replacement information added device registration table illustrated in FIG. 15 further includes a replace_model_id 1505 that represents a model ID of the target image forming apparatus 103 to be replaced. If an image forming apparatus 103 is simply added to the network printing system without performing any replacement, data input in the items 1504 and 1505 can be omitted.

According to the example illustrated in FIG. 15, each record can be defined by values of respective items 1501 to 1505. For example, in the first row of the replacement information added device registration table, the device_id 1501 is "dev_a_sr8rIheJmCd6npd", the site_id 1502 is "site_0001", and the service_id 1503 is "print." Further, the replace_device_id 1504 is "dev_old00001" and the replace_model_id is "model_old0001."

FIG. 16 is a flowchart illustrating an example of processing for generating and launching a WorkerRole instance 511 corresponding to a newly added image forming apparatus 103 and deleting a WorkerRole instance 511 to be replaced. The processing to be performed according to the present exemplary embodiment is different from the processing described in the first exemplary embodiment in that the replacement processing is performed after a new WorkerRole instance 511 is launched. Processing to be performed in step S1601 to step S1613 is similar to the processing performed in step S1001 to step S1013 illustrated in FIG. 10.

If the determination result in step S1613 is Yes, it indicates that the WorkerRole instance 511 has already launched. Thus, in step S1614, the individual request reception unit 602 determines whether there is any replacement information in the replacement information added device registration table described with reference to FIG. 15. If the determination result in step S1614 is No, it indicates that there is not any target to be replaced. Thus, the processing proceeds to step S1616, in which the individual request reception unit 602 transmits the preparation completion screen described with reference to FIG. 14A to the device browser 408 of the image forming apparatus 103. As a result of the above-described processing, the service becomes usable in the image forming apparatus 103.

If the determination result in step S1614 is Yes, it is confirmed that there is a WorkerRole instance 511 to be replaced (i.e., replacement target). Thus, in step S1615, the individual request reception unit 602 causes the fabric controller 503 to reduce the number of instances with respect to the WorkerRole instance 511. More specifically, in step S1615, the individual request reception unit 602 reads the setting file of the back-end processing unit 402 to be replaced, via the fabric controller 503, and decreases the value of the setting item "Instances_Count" in decrements of one.

Further, in a case where the previous value of the setting item "Instances_Count" is "1", the individual request reception unit 602 requests the fabric controller 503 to deactivate the corresponding back-end processing unit 402. After the deletion processing in step S1615 is completed, the processing proceeds to step S1616.

Through the above-described processing, in the present exemplary embodiment, the back-end processing unit 402 can be automatically generated and launched even when the image forming apparatus 103 that constitutes the network printing system is replaced. Therefore, the present exemplary embodiment can reduce the time and labor required before the network printing system becomes available, and can improve the easiness in installation.

In a third exemplary embodiment, the network printing system deregisters the image forming apparatus 103 and deletes a corresponding WorkerRole instance 511 of the back-end processing unit 402.

Figure 17A:
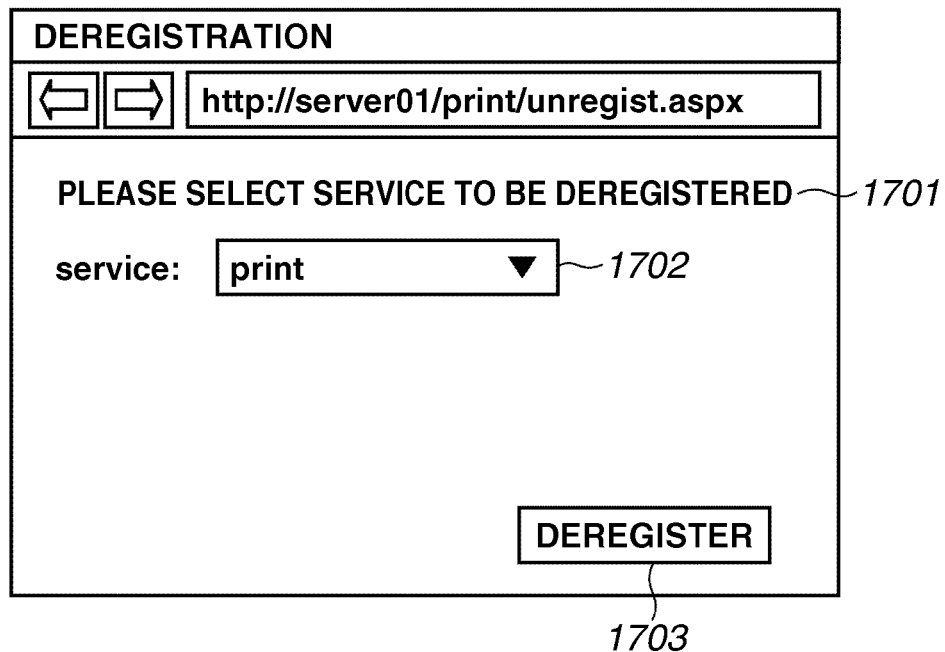
FIG. 17A illustrates an example of a deregistration screen that can be displayed on a device browser of the image forming apparatus according to an exemplary embodiment.

FIG. 17A illustrates an example of a deregistration screen that can be displayed on the device browser 408 of the image forming apparatus 103. The deregistration screen illustrated in FIG. 17A includes a field 1701 of a message that requests a user to select a service to be deregistered. The deregistration screen illustrated in FIG. 17A further includes a drop-down list 1702 that can display currently available services relating to the image forming apparatus 103, which are registered in the network printing system. The drop-down list 1702 enables a user to select a service to be deregistered.

The deregistration screen illustrated in FIG. 17A further includes a button 1703 that can be displayed on the device browser 408 of the image forming apparatus 103. If a user operation on the button 1703 is accepted, the device browser 408 transmits a deregistration request to the initial request reception unit 601.

Figure 17B:
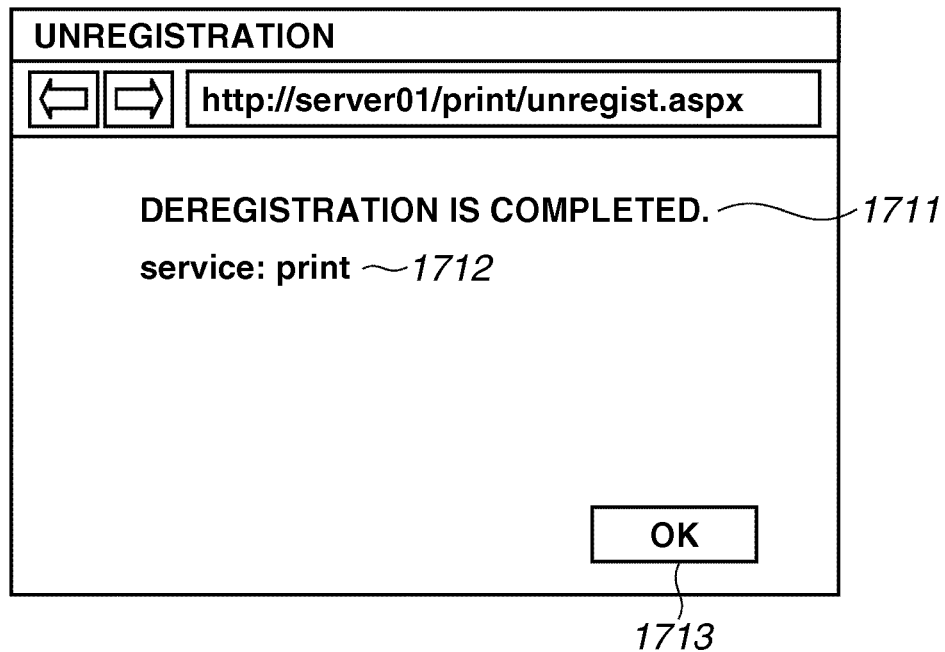
FIG. 17B illustrates an example of a deregistration completion screen that can be displayed on the device browser of the image forming apparatus according to an exemplary embodiment.

FIG. 17B illustrates an example of a deregistration completion screen that can be displayed on the device browser 408 of the image forming apparatus 103. The deregistration completion screen illustrated in FIG. 17B includes a field 1711 of a message that notifies a user of completion of the service deregistration. The deregistration completion screen illustrated in FIG. 17B further includes a label 1712 that represents a deregistration completed service. A button 1713 can be displayed on the device browser 408 of the image forming apparatus 103. If a user operation is accepted, the device browser 408 goes back to the previous screen.

Subsequent processing is described below with reference to FIG. 18. FIG. 18 is a flowchart illustrating an example of processing for deleting and deregistering a corresponding WorkerRole instance 511 of the back-end processing unit 402 in response to a service deregistration request received from the image forming apparatus 103.

In step S1801, the device browser 408 of the image forming apparatus 103 transmits the deregistration request to the initial request reception unit 601 according to the deregistration screen described with reference to FIG. 17A. The deregistration request includes a device ID and a model ID of the image forming apparatus 103 together with the service ID selected in the drop-down list 1702 illustrated in FIG. 17A. The deregistration request is an example of a disconnection request.

In step S1802, the initial request reception unit 601 receives the deregistration request transmitted in step S1801.

In step S1803, the initial request reception unit 601 acquires a record that coincides with the device ID and the service ID received in step S1802 from the device registration table described with reference to FIG. 7A. Further, the initial request reception unit 601 acquires URI of the corresponding individual request reception unit 602 from the individual request reception unit management table described with reference to FIG. 7B. Further, the initial request reception unit 601 again transmits the deregistration request to the individual request reception unit 602 corresponding to the acquired URI.

In step S1804, the individual request reception unit 602 receives the deregistration request transmitted in step S1803.

In step S1805, the individual request reception unit 602 transmits a deregistration-in-progress message, via the initial request reception unit 601, to the device browser 408 of the image forming apparatus 103. Through the above-described processing, a message informing that the deregistration processing is currently in progress can be displayed on the screen described with reference to FIG. 17A.

In step S1806, the individual request reception unit 602 identifies a coincident back-end processing unit 402 from the service instance management table described with reference to FIG. 7C based on the model ID and the service ID included in the deregistration request received in step S1804. Further, the individual request reception unit 602 causes the fabric controller 503 to decrease the number of instances in decrements of one with respect to the coincident back-end processing unit.

More specifically, the individual request reception unit 602 causes the fabric controller 503 to decrease the setting value of the number of instances in decrements of one with respect to the WorkerRole instance 511, in the setting file of the back-end processing unit 402 described with reference to FIG. 11B. The fabric controller 503 stores the updated setting value.

In step S1807, the individual request reception unit 602 causes the fabric controller 503 to deactivate the WorkerRole instance 511 of the back-end processing unit 402 whose setting has been changed in step S1806.

In step S1808, the individual request reception unit 602 causes the fabric controller 503 to wait for the deactivation of the WorkerRole instance 511 of the back-end processing unit 402 that has been instructed to be deactivated in step S1807.

In step S1809, the individual request reception unit 602 causes the fabric controller 503 to determine whether the deactivation of the WorkerRole instance 511 of the back-end processing unit 402 has been completed.

If the determination result in step S1809 is No, the processing returns to step S1808. The individual request reception unit 602 further waits for the termination of the WorkerRole instance 511 of the back-end processing unit 402. If the determination result in step S1809 is Yes, the individual request reception unit 602 determines that deletion of the WorkerRole instance 511 of the back-end processing unit 402 has been completed. Thus, the processing proceeds to step S1810.

In step S1810, the individual request reception unit 602 transmits a message informing deletion completion and deregistration completion with respect to the WorkerRole instance 511 of the back-end processing unit 402, via the initial request reception unit 601, to the device browser 408 of the image forming apparatus 103.

In step S1811, the device browser 408 of the image forming apparatus 103 receives the deregistration completion message transmitted in step S1810.

In step S1812, the device browser 408 of the image forming apparatus 103 displays the deregistration completion screen described with reference to FIG. 17B.

In step S1813, the individual request reception unit 602 transmits the device ID and the service ID included in the deregistration request received in step S1804 to the initial request reception unit 601. The individual request reception unit 602 requests the initial request reception unit 601 to update the device registration table described with reference to FIG. 7A.

In step S1814, the initial request reception unit 601 receives the device ID and the service ID transmitted in step S1813, and identifies a record that coincides with the device registration table described with reference to FIG. 7A. Then, the initial request reception unit 601 deletes a service ID that coincides with the received service ID from the column of the service_id 703. Then, the initial request reception unit 601 stores the updated information.

Through the above-described processing, in the present exemplary embodiment, the back-end processing unit 402 can be automatically deleted even when the image forming apparatus 103 is deregistered from the network printing system. Therefore, the present exemplary embodiment can reduce the time and labor required in management, and can improve the easiness in maintenance.

In a fourth exemplary embodiment, the network printing system uses a license management server to perform the service registration confirmation processing performed in step S1003, which has been described in the first exemplary embodiment.

The network printing system according to the present exemplary embodiment additionally includes the license management server. The license management server has an internal configuration similar to that of the information processing apparatus described with reference to FIG. 3. The license management server has a table similar to the device registration table described with reference to FIG. 7A.

In the present exemplary embodiment, the initial request reception unit 601 causes the license management server to execute processing for confirming whether registration of the image forming apparatus 103 is completed.

More specifically, the initial request reception unit 601 receives a device ID transmitted from the image forming apparatus 103. Subsequently, the initial request reception unit 601 causes the license management server to confirm whether the received device ID is already registered. For example, to realize the confirmation processing, the initial request reception unit 601 can transmit the device ID to the license management server via a web service and receive a response indicating a confirmed registration result.

Subsequently, if the initial request reception unit 601 determines that the registration is not yet completed based on the result returned from the license management server, the initial request reception unit 601 transmits the unregistration notification screen to the device browser 408 of the image forming apparatus 103. If the initial request reception unit 601 determines that the registration is already completed, the processing proceeds to step S1005 and subsequent steps illustrated in FIG. 10.

Through the above-described processing, in the present exemplary embodiment, the back-end processing unit 402 can be automatically generated and launched by using the license management server when an image forming apparatus 103 is newly added to the network printing system. Therefore, the present exemplary embodiment can reduce the time and labor required before the network printing system becomes available, and can improve the easiness in installation.

In a fifth exemplary embodiment, an alternative back-end processing unit is temporarily used until the image forming apparatus 103 is connected to the network printing system and the individual request reception unit 602 completes generation and launching of a corresponding WorkerRole instance 511 of the back-end processing unit 402. The alternative back-end processing unit according to the fifth exemplary embodiment is usable, for example, in a case where there is any other type (model) of image forming apparatus 103 that can provide a similar or comparable service.

Figure 19:
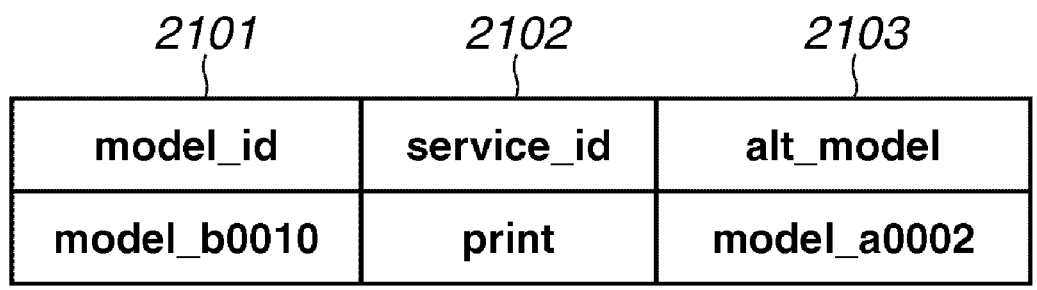
FIG. 19 illustrates an example of an alternative service management table that can be used when an alternative back-end processing unit is temporarily used according to an exemplary embodiment.

FIG. 19 illustrates an example of an alternative service management table that can be used when an alternative back-end processing unit is temporarily used. The alternative service management table can be stored in the table storage service 506. The alternative service management table can be held by each individual request reception unit 602.

The alternative service management table illustrated in FIG. 19 includes a model_id 2101 (i.e., one of the Partition-Key columns) that represents a model ID of the WorkerRole instance 511 corresponding to a newly added image forming apparatus 103 whose launching processing is not yet completed. The alternative service management table illustrated in FIG. 19 further includes a service_id 2102 (i.e., one the RowKey columns) that represents a service ID of the WorkerRole instance 511 corresponding to the newly added image forming apparatus 103 whose launching processing is not yet completed. The alternative service management table illustrated in FIG. 19 further includes an alt_model 2103 that represents an alternative model_id of the model_id 2101.

Figure 20:
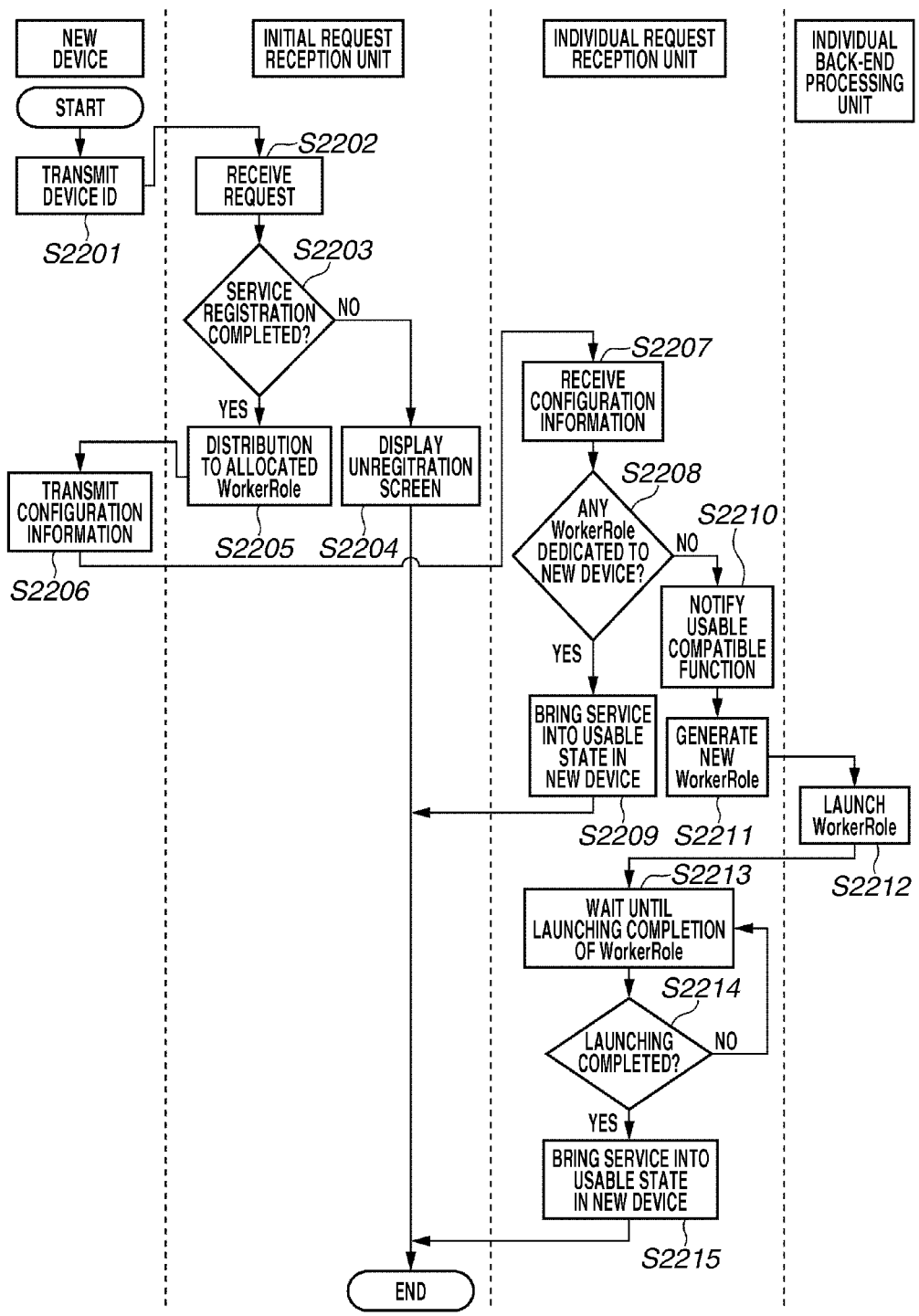
FIG. 20 is a flowchart illustrating an example of processing for generating and launching a WorkerRole instance corresponding to a newly added image forming apparatus and temporarily using an alternative WorkerRole instance until the launching processing is completed.

FIG. 20 is a flowchart illustrating an example of processing for generating and launching a WorkerRole instance 511 corresponding to a newly added image forming apparatus 103 and temporarily using an alternative WorkerRole instance 511 until the launching processing is completed. Processing to be performed in steps S2201 to S2209 is similar to the processing performed in steps S1001 to S1009 illustrated in FIG. 10.

If the determination result in step S2208 is No, the processing proceeds to step S2210. In step S2210, the individual request reception unit 602 notifies the image forming apparatus 103 of the presence of an alternative back-end processing unit 402. More specifically, the individual request reception unit 602 transmits the screen illustrated in FIG. 14A to the device browser 408 of the image forming apparatus 103, and notifies a current situation with a message "an alternative service is usable."

Subsequently, until launching of the WorkerRole instance 511 is completed, a service having the service_id 2102 identified by the alternative model ID (alt_model 2103) corresponding to the model_id 2101 illustrated in FIG. 19 becomes usable. In the present exemplary embodiment, the alternative back-end processing unit 402 is an example of an alternative instance.

Processing to be performed in step S2211 to 2214 is similar to the processing performed in steps S1010 to S1013 described with reference to FIG. 10.

In step S2215, based on the fact that the WorkerRole instance 511 has been launched, the individual request reception unit 602 transmits the preparation completion screen described with reference to FIG. 14A to the device browser 408 of the image forming apparatus 103. Then, the individual request reception unit 602 notifies a current situation with a message "the service is usable." Subsequently, the image forming apparatus 103 can use a registration completed service that corresponds to the model_id 721 and the service_id 722 described with reference to FIG. 7C.

Through the above-described processing, in the present exemplary embodiment, the alternative service is available until the back-end processing unit is automatically generated and launched when an image forming apparatus 103 is newly added to the network printing system. Accordingly, the present exemplary embodiment can reduce a waiting time required before the network printing system becomes usable, and therefore can improve the convenience.

Further, embodiments can be realized by executing the following processing. More specifically, example processing includes supplying a software program capable of realizing functions according to the above-described exemplary embodiments via a network or an appropriate storage medium to a system or an apparatus, and causing a computer (or CPU or micro-processing unit (MPU)) of the system or the apparatus to read and execute the supplied program.

Each of the above-described exemplary embodiments can reduce the time and labor required before a device newly added to a cloud computing system becomes available and can improve the easiness in installing the device.

The present invention is not limited to the above-described exemplary embodiments. Each of the above-described exemplary embodiments can be modified and changed appropriately in various ways within the scope of the present invention defined by the following claims.

For example, in the above-described present exemplary embodiments, the image forming apparatus has been described as an example of the device added to the cloud computing system. However, the device added to the cloud computing system is not limited to the image forming apparatus.

Aspects of the embodiments can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable medium may store a program that causes a device, computer server, and/or a cloud computing system to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-121962 filed May 27, 2010, which is hereby incorporated by reference herein in its entirety.

What is claimed is:

1. A cloud computing system including a group of server computers, the cloud computing system comprising:
   an initial request reception unit configured to receive a connection request from a device configured to transmit the connection request, a service usage request, and service identification information, wherein the initial request reception unit includes a notification unit configured to notify the device of information required to identify a request reception unit configured to receive a service usage request;
   a request reception unit configured, in a case where the device has tried to access the request reception unit based on the information required to identify a request reception unit, to receive a service usage request and service identification information transmitted from the device, wherein the request reception unit includes a determination unit configured to determine, based on the received service identification information, whether a back-end processing unit is present that both corresponds to the device and is configured to execute the service; and
   a transmission unit configured, in a case where the determination unit determines that a back-end processing unit that both corresponds to the device and is configured to execute the service is present, to transmit a service utilization preparation completion screen to the device without instructing generation of an instance that can realize the back-end processing unit and, in a case where the determination unit determines that a back-end processing unit that both corresponds to the device and is configured to execute the service is not present, to send an instance generation instruction to a management unit configured to manage instances and to further send an instruction to launch an instance generated to execute the service, wherein after the instance is launched and the back-end processing unit is realized, the transmission unit further is configured to transmit the service utilization preparation completion screen to the device, wherein the request reception unit further is configured to transmit the service utilization preparation completion screen to the device if it is determined that a service instance is present.

2. A cloud computing system including a group of server computers, the cloud computing system comprising:
   a management unit;
   an initial request reception unit configured to receive a connection request from a device and, if it is determined that the device is a registration completed device, notify the device of information indicating a request reception unit configured to receive a request that corresponds to a service that can be used by the device as well as service identification information required to identify the service; and
   a request reception unit configured to receive, from the device, device model information and the service identification information, and to determine whether a service instance is present that both is configured to perform processing for providing the service identified by the service identification information and corresponds to the received device model information and the service identification information, and, in a case where the request reception unit determines that the service instance is not present, the request reception unit further is configured to send a service instance generation instruction to a management unit configured to manage instances and send an instruction to launch a generated instance, wherein, if the generated instance is launched, the request reception unit further is configured to transmit a service utilization preparation completion screen to the device.

3. The cloud computing system according to claim 2, wherein, when the generated instance is launched, if the device is replaceable by any other device upon connection of the device, the request reception unit sends to the management unit an instruction to deactivate one service instance of a plurality of service instances that can be used by the device, and further sends to the management unit an instruction to delete the deactivated one service instance, and if the one service instance is deleted, the request reception unit transmits the service utilization preparation completion screen to the device.

4. The cloud computing system according to claim 3, wherein
if a disconnection request is received from the device, the initial request reception unit is configured to transmit the disconnection request to the request reception unit that receives a request corresponding to a service that can be used by the device, and
if the disconnection request is received from the initial request reception unit, the request reception unit is configured to send to the management unit the instruction to deactivate the one service instance and further to send to the management unit the instruction to delete the deactivated instance.

5. The cloud computing system according to claim 4, wherein if the request reception unit receives the device model information and the service identification information from the device in a case where the request reception unit determines that the service instance is not present that both is configured to perform processing for providing the service identified by the service identification information and corresponds to the received device model information and the service identification information, the request reception unit notifies the device of availability of an alternative instance until generation and launching of the instance is completed.

6. A server computer, comprising:
a memory;
a processor;
an initial request reception unit configured to receive a connection request from a device and, if it is determined that the device is a registration completed device, notify the device of information indicating a request reception unit configured to receive a request that corresponds to a service that can be used by the device as well as service identification information required to identify the service; and
a request reception unit configured to receive, from the device, device model information and the service identification information, and to determine whether a service instance is present that both is configured to perform processing for providing the service identified by the service identification information and corresponds to the received device model information and the service identification information, and, in a case where the request reception unit determines that the service instance is not present, the request reception unit further is configured to send a service instance generation instruction to a management unit configured to manage instances and send an instruction to launch a generated instance, wherein, if the generated instance is launched, the request reception unit further is configured to transmit a service utilization preparation completion screen to the device, wherein the request reception unit further is configured to transmit the service utilization preparation completion screen to the device if it is determined that a service instance is present.

7. A device connection method for connecting a device to a cloud computing system including a group of server computers, the device connection method comprising:
receiving a connection request from a device and, if it is determined that the device is a registration completed device, notify the device of information indicating a request reception unit configured to receive a request that corresponds to a service that can be used by the device as well as service identification information required to identify the service; and
receiving, in a request reception unit from the device, device model information and the service identification information, and determining whether a service instance is present that both is configured to perform processing for providing the service identified by the service identification information and corresponds to the received device model information and the service identification information; and
in a case where it is determined that that the service instance is not present, sending a service instance generation instruction to a management unit configured to manage instances and sending an instruction to launch a generated instance, wherein, if the generated instance is launched, transmitting a service utilization preparation completion screen to the device, wherein the request reception unit further is configured to transmit the service utilization preparation completion screen to the device if it is determined that a service instance is present.

8. A non-transitory computer-readable medium storing a program that causes a group of server computers to functionally operate as:
an initial request reception unit configured to receive a connection request from a device and, if it is determined that the device is a registration completed device, notify the device of information indicating a request reception unit configured to receive a request that corresponds to a service that can be used by the device as well as service identification information required to identify the service; and
a request reception unit configured to receive, from the device, device model information and the service identification information, and to determine whether a service instance is present that both is configured to perform processing for providing the service identified by the service identification information and corresponds to the received device model information and the service identification information, and, in a case where the request reception unit determines that the service instance is not present, the request reception unit further is configured to send a service instance generation instruction to a management unit configured to manage instances and send an instruction to launch a generated instance, wherein, if the generated instance is launched, the request reception unit further is configured to transmit a service utilization preparation completion screen to the device, wherein the request reception unit further is configured to transmit the service utilization preparation completion screen to the device if it is determined that a service instance is present.

* * * * *